US010079804B2

(12) United States Patent
Suzuki et al.

(10) Patent No.: US 10,079,804 B2
(45) Date of Patent: Sep. 18, 2018

(54) PACKET TRANSMISSION SYSTEM, PACKET TRANSMISSION APPARATUS, AND PACKET TRANSMISSION METHOD

(71) Applicant: NEC Corporation, Minato-ku, Tokyo (JP)

(72) Inventors: Jun Suzuki, Tokyo (JP); Yuki Hayashi, Tokyo (JP); Masaki Kan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/114,935

(22) PCT Filed: Feb. 5, 2015

(86) PCT No.: PCT/JP2015/000515
§ 371 (c)(1),
(2) Date: Jul. 28, 2016

(87) PCT Pub. No.: WO2015/118870
PCT Pub. Date: Aug. 13, 2015

(65) Prior Publication Data
US 2016/0344691 A1    Nov. 24, 2016

(30) Foreign Application Priority Data

Feb. 6, 2014  (JP) .................................. 2014-021370

(51) Int. Cl.
*H04L 12/28*  (2006.01)
*H04L 29/12*  (2006.01)
(Continued)

(52) U.S. Cl.
CPC ...... *H04L 61/2592* (2013.01); *H04L 12/2865* (2013.01); *H04L 12/4633* (2013.01); *H04L 47/50* (2013.01); *H04L 47/625* (2013.01)

(58) Field of Classification Search
None
See application file for complete search history.

(56) References Cited

U.S. PATENT DOCUMENTS 7,577,123 B2 *  8/2009  Hashimoto ............. H04L 29/06
                                                  370/328
7,924,721 B2      4/2011  Nishikawa et al.
(Continued)

FOREIGN PATENT DOCUMENTS

JP    2007-049626 A    2/2007
JP    2007-049696 A    2/2007
(Continued)

OTHER PUBLICATIONS

Kyungtae Kim et al., "On Packet Aggregation Mechanisms for Improving VoIP Quality in Mesh Networks", IEEE 63rd Vehicular Technology Conference, May 7-10, 2006, pp. 891-895.
(Continued)

*Primary Examiner* — Michael J Moore, Jr.

(57) ABSTRACT

Disclosed are a packet transmission apparatus and so on that can suppress transmission delays caused by packet integrations and that can perform the transmissions over a broad band. The packet transmission apparatus includes: a packet extraction means that searches for and extracts, from a buffer for sorting and accumulating packets for respective destinations, the packets for the respective destinations and that, if a plurality of packets addressed to an identical destination have been accumulated in the buffer, extracts the plurality of packets from the buffer; and an encapsulation means that encapsulates the packets, which have been extracted by the packet extraction means, into a single packet for each destination.

9 Claims, 15 Drawing Sheets

(51) Int. Cl.
*H04L 12/46* (2006.01)
*H04L 12/863* (2013.01)

(56) References Cited

U.S. PATENT DOCUMENTS

| | | | |
|---|---|---|---|
| 8,804,751 B1* | 8/2014 | Poole | H04L 49/90 370/229 |
| 8,811,308 B1* | 8/2014 | Goodson | H04L 47/125 370/329 |
| 9,313,049 B2 | 4/2016 | Tamura | |
| 2004/0057377 A1* | 3/2004 | Tinney | H04L 45/20 370/230 |
| 2006/0104299 A1* | 5/2006 | Vazquez Castro | H04B 7/18582 370/412 |
| 2006/0227752 A1* | 10/2006 | Sashihara | H04W 28/06 370/338 |
| 2007/0268897 A1 | 11/2007 | Nishikawa et al. | |
| 2008/0056295 A1* | 3/2008 | Loda | H04L 45/10 370/437 |
| 2012/0300778 A1 | 11/2012 | Tamura | |
| 2013/0243004 A1* | 9/2013 | Hikichi | H04L 12/66 370/401 |
| 2013/0343182 A1 | 12/2013 | Hassan et al. | |

FOREIGN PATENT DOCUMENTS

| | | |
|---|---|---|
| JP | 2007-251653 A | 9/2007 |
| JP | 2009-218652 A | 9/2009 |
| JP | 2012-248956 A | 12/2012 |

OTHER PUBLICATIONS

Yongzhen Zhuang, Kun Tan, Vincent Shen and Yunhao Liu,"VoIP Aggregation in Wireless Backhaul Networks", Proceedings of 2006 IEEE International Conference on Communications, IEEE, Jun. 11, 2006, pp. 5468-5473.

International Search Report for PCT Application No. PCT/JP2015/000515, dated Apr. 7, 2015.

English translation of Written opinion for PCT Application No. PCT/JP2015/000515.

\* cited by examiner

Fig. 6

125 ENCAPSULATION TABLE

| PACKET DESTINATION ADDRESS | ENCAPSULATION ADDRESS |
|---|---|
| AAAA_AAAA | xxxx_xxxx |
| BBBB_BBBB | yyyy_yyyy |
| ⋮ | ⋮ |

PACKET TRANSMISSION SYSTEM, PACKET TRANSMISSION APPARATUS, AND PACKET TRANSMISSION METHOD

This application is a National Stage Entry of PCT/JP2015/000515 filed on Feb. 5, 2015, which claims priority from Japanese Patent Application 2014-021370 filed on Feb. 6, 2014, the contents of all of which are incorporated herein by reference, in their entirety.

TECHNICAL FIELD

The present invention relates to a packet transmission system, a packet transmission apparatus, a packet transmission method, and the like to transmit packets.

BACKGROUND ART

Mutual transmission of packets among nodes interconnected by way of a network has been carried out (see, for example, PTLs 1 and 2).

An example of a configuration of such a packet transmission system is described in NPL 1.

A packet transmission system described in NPL 1 includes a first network node 500, a second network node 600, and a third network node 700, as illustrated in FIG. 14. The respective network nodes (the first network node 500, the second network node 600, and the third network node 700) are interconnected by way of a network 800 and communicates with one another. In FIG. 14 and the following description that will be made with reference to FIG. 14, a case is assumed in which the number of network nodes is three. However, it is assumed to include three network nodes only for convenience of description, and it is not intended to limit the number of network nodes included in a packet transmission system. An arbitrary number of network nodes may be included in a packet transmission system.

Next, a configuration of the first network node 500 will be described with further reference to FIG. 14. Although the following description will be made using the configuration of the first network node 500 as an example, it is assumed that the configurations of the second network node 600 and the third network node 700 are the same as that of the first network node 500.

The first network node 500 includes a packet output application 510, a packet integration queue 520, a packet integration unit 530, a memory 540, and a packet receiving unit 550.

The packet output application 510 outputs packets to be transmitted to the network 800 to the packet integration queue 520.

The packet integration queue 520 accumulates packets that the packet output application 510 has output.

The packet integration unit 530 integrates a plurality of packets that have been accumulated in the packet integration queue 520 and transmits the integrated packets to the network 800. The transmitted packets are delivered to the second network node 600 and/or the third network node 700.

The memory 540 holds operational parameters for the packet integration unit 530.

The packet receiving unit 550 receives packets that the second network node 600 and/or the third network node 700 have transmitted by way of the network 800 and hands the received packets to the packet output application 510.

The packet integration unit 530 holds a timer 531, which is a timer to detect a timeout that provides a chance to transmit an integrated packet.

Further, the memory 540 holds a minimum integration number 541, which indicates a minimum value of the number of integrated packets, and a timeout value 542, which indicates a timeout value of packet integration.

Further, a packet P 521 and packets P' 522 are illustrated as packets integrated in the packet integration queue 520. In this case, the packet P 521 is a leading packet in the packet integration queue 520, and the packets P' 522 are packets having the same destination as the packet P 521.

An operation of a general packet transmission system having such a configuration will be described with reference to a flowchart in FIG. 15. As described above, the respective network nodes (the first network node 500, the second network node 600, and the third network node 700) transmit and receive packets with one another by way of the network 800. The following description will be made using an operation when the packet output application 510 included in the first network node 500 transmits packets to the network 800 as an example.

First, packets that the packet output application 510 has output are accumulated in the packet integration queue 520. When at least one packet enters the packet integration queue 520, the packet integration unit 530 refers to the packet integration queue 520. When the packet P 521 is present at the top of the packet integration queue 520 and the number of packets P' 522 with the same destination as the packet P 521 accumulated in the packet integration queue 520 is greater than the minimum integration number 541 (Yes in step S51), the packet integration unit 530 performs the following. That is, the packet integration unit 530 creates an integrated packet into which the packet P 521 and the packets P' 522 are integrated (step S52).

The number of packets P' 522 integrated into an integrated packet is either all the packets P' 522 or a maximum value of the number of integrated packets allowed by a maximum packet length. That is, it is assumed that the number of packets P' 522 accumulated in the packet integration queue 520 is three. When an integrated packet into which the three packets P' 522 and the packet P 521 are integrated falls within the maximum value of the number of integrated packets allowed by the maximum packet length, the packet integration unit 530 creates an integrated packets into which the three packets P' 522 and the packet P 521 are integrated. On the other hand, when an integrated packet into which the above-described three packets P' 522 and the packet P 521 are integrated does not fall within the maximum value of the number of integrated packets allowed by the maximum packet length, the packet integration unit 530 creates an integrated packet into which two (or one) packet(s) P' 522 out of the three packets P' 522 and the packet P 521 are integrated so that the integrated packet falls within the maximum value of the number of integrated packets.

On the other hand, when the condition in step S51 is not satisfied (No in step S51), the packet integration unit 530 proceeds to step S53 without performing processing in step S52.

Next, the packet integration unit 530 refers to the packet integration queue 520 and, when the packet P 521 is present at the top of the queue and the timer 531, which was set to the timeout value 542, has timed out (Yes in step S53), performs the following. That is, the packet integration unit 530 creates a packet into which the packet P 521 and the packets P' 522 are integrated (step S54). The number of packets P' 522 that are integrated into an integrated packet in this step is the same as that in step S52.

On the other hand, when the condition in step S53 is not satisfied (No in step S53), the packet integration unit 530 proceeds to step S55 without performing processing in step S54.

Next, when an integrated packet is created in step S52 or S54, the packet integration unit 530 transmits the created packet to the network 800 (step S55).

Next, the packet integration unit 530 resets the timeout value in the timer 531 to a value defined by the timeout value 542 (step S56). The packet integration unit 530 continues time measurement using the timer 531 again.

Next, the packet integration unit 530 returning to the operation in step S51 enables the general packet transmission system to transmit packets output by the packet output application 510 to the network 800 continuously.

By means of the operation as described above, the general packet transmission system first integrates a plurality of packets to be transmitted to an identical destination and then transmits the integrated packet to the network. With this operation, the packet transmission system achieves packet transmission in a wider bandwidth compared with a case in which a plurality of packets to be transmitted to an identical destination are transmitted individually.

As an example, when the network 800 is a network conforming to a wireless LAN (Local Area Network) protocol, a time interval between packets transmitted successively is stipulated by the network protocol. As a result, a transmission band in which the packet output application 510 is able to transmit packets to the network 800 is restricted. However, integrating a plurality of packets and transmitting the integrated packets enable time intervals between packets integrated into a packet to be eliminated, which makes it possible to achieve a wideband packet communication.

CITATION LIST

Patent Literature

PTL 1: Japanese Patent Application Laid-open Publication No. 2009-218652
PTL 2: Japanese Patent Application Laid-open Publication No. 2007-049696
NPL 1: K. Kim, S. Ganguly, R. Izmailov, S. Hong [On Packet Aggregation Mechanisms for Improving VoIP Quality in Mesh Networks] IEEE 63rd Vehicular Technology Conference, May 7-10, 2006, pp. 891-895

SUMMARY OF INVENTION

Technical Problem

As described above, the use of a technology described in NPL 1 or the like enables wideband packet communication to be achieved. However, there have been at least two problems, which will be pointed out below, in the technology described in NPL 1 or the like.

The first problem is that transmission delay occurs to packets in integrating packets.

That is because packets to be integrated are forced to wait in a packet integration queue.

The second problem is that management of the packet transmission system is complicated. That is because a minimum integration number and a timeout value for waiting for packet integration are required to be set properly in accordance with the conditions of a network, connected nodes, and so on.

Accordingly, a primary object of the present invention is to provide a packet transmission system and the like that enable transmission delay caused by packet integration to be suppressed and wideband transmission to be performed.

Solution to Problem

A packet transmission apparatus according to first aspect of the present invention includes:

a packet extraction means for, from a buffer in which packets are sorted and accumulated in accordance with each destination, searching for packets with respect to each destination to extract the packets and, when a plurality of packets addressed to an identical destination are accumulated, extracting the plurality of packets from the buffer; and an encapsulation means for encapsulating packets extracted by the packet extraction means into a single packet with respect to each destination.

The packet transmission apparatus is provided.

A packet transmission system according to first aspect of the present invention includes:

a plurality of packet transmission apparatuses which includes a packet extraction means for, from a buffer in which packets are sorted and accumulated in accordance with each destination, searching for packets with respect to each destination to extract the packets and, when a plurality of packets addressed to an identical destination are accumulated, extracting the plurality of packets from the buffer; and an encapsulation means for encapsulating packets extracted by the packet extraction means into a single packet with respect to each destination.

A packet transmission method according to first aspect of the present invention is a transmission method performed by the packet transmission apparatus and includes:

from a buffer in which packets are sorted and accumulated in accordance with each destination, searching for packets with respect to each destination to extract the packets and, when a plurality of packets addressed to an identical destination are accumulated, extracting the plurality of packets from the buffer; and encapsulating extracted packets into a single packet with respect to each destination.

A program storage medium according to first aspect of the present invention storing a packet transmission program that causes a computer to execute:

a process that, from a buffer in which packets are sorted and accumulated in accordance with each destination, searches for packets with respect to each destination to extract the packets and, when a plurality of packets addressed to an identical destination are accumulated, extracting the plurality of packets from the buffer; and a process that encapsulates extracted packets into a single packet with respect to each destination.

Advantageous Effects of Invention

A first advantageous effect of the present invention is to enable transmission delay caused by packet integration to be suppressed and wideband transmission to be performed.

BRIEF DESCRIPTION OF DRAWINGS

FIG. 6 is a schematic diagram for a description of an encapsulation table of the packet integration device in the first exemplary embodiment of the present invention;

DESCRIPTION OF EMBODIMENTS

First Exemplary Embodiment

First, exemplary embodiments of the present invention will be summarized. An object of the exemplary embodiments of the present invention is to solve problems in that transmission delay occurs to packets to be integrated and the number of integrated packets and a timeout value for waiting for packet integration being required to be set causes management to become complicated when a plurality of packets are integrated and transmitted to a network.

To solve the above problems, a packet transmission system, which is an exemplary embodiment of the present invention, includes a buffer configured to sort and accumulate packets in internal queues for respective destinations and an extraction unit. The extraction unit searches the internal queues in the buffer at a preset rate in a round-robin fashion and extracts all packets addressed to an identical destination that have been accumulated in an internal queue being searched. The packet transmission system extracts all packets addressed to an identical destination that have been accumulated in the buffer using a limit, defined based on a maximum packet length for the network, as an upper limit of the total size of the extracted packets, and encapsulates one or more extracted packets into a single packet to transmit the encapsulated packet to the network.

Employing such a configuration and integrating and encapsulating a plurality of packets addressed to an identical destination that are accumulated at the time in an internal queue being searched in a round-robin fashion to transmit the encapsulated packet to the network enable a plurality of packets to be integrated and encapsulated without causing a transmission delay to the packets. This configuration enables an overhead on a network bandwidth caused by encapsulation headers to be reduced, compared with a case in which a plurality of packets are individually encapsulated and transmitted to the network, and wideband packet transmission to be achieved. Moreover, since packets that are accumulated at the time in an internal queue, which is searched in a round-robin fashion, are integrated, the number of packets to be integrated can be set automatically. With this configuration, it becomes possible to solve the above-described problems. The above is a summary of the exemplary embodiments of the present invention.

Next, a first exemplary embodiment of the present invention will be described in detail with reference to the drawings.

Figure 1:
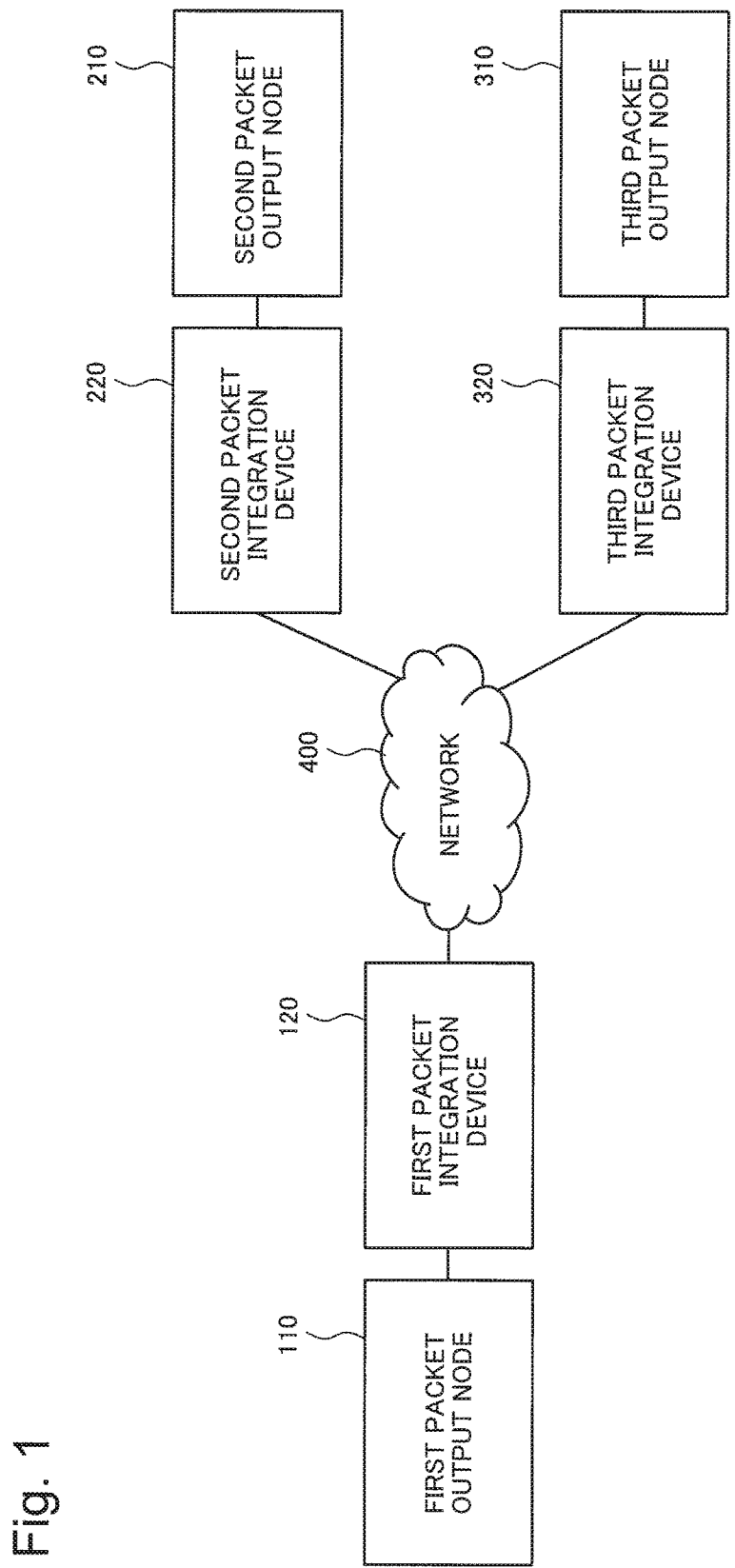
FIG. 1 is a block diagram illustrating an overall basic configuration of a first exemplary embodiment of the present invention.

Referring to FIG. 1, the exemplary embodiment of the present invention includes a first packet output node 110, a second packet output node 210, and a third packet output node 310 and a first packet integration device 120, a second packet integration device 220, and a third packet integration device 320. In the above configuration, the first packet integration device 120, the second packet integration device 220, and the third packet integration device 320 are equivalent to a "packet transmission apparatus" of the claimed invention.

The first packet output node 110, the second packet output node 210, and the third packet output node 310 perform transmission and reception of packets among the packet output nodes with one another.

The first packet integration device 120, the second packet integration device 220, and the third packet integration device 320 are interconnected by way of a network 400. Each packet integration device integrates a plurality of packets that the first packet output node 110, the second packet output node 210, or the third packet output node 310 has output and transmits the integrated packet to the network 400.

The configurations of the first packet output node 110, the second packet output node 210, and the third packet output node 310 are the same as one another. The configurations of the first packet integration device 120, the second packet integration device 220, and the third packet integration device 320 are also the same as one another. In the description herein, a case is assumed in which three combinations of a packet output node and a packet integration device are involved. However, the number of combinations is set at three only for convenience of description, and it is not intended to limit the number of combinations of a packet output node and a packet integration device included in the packet transmission system. An arbitrary number of combinations of a packet output node and a packet integration device may be included in the packet transmission system. While the packet output nodes and packet integration devices may be achieved as a plurality of individually separate apparatuses, a single apparatus may achieve both a packet output node and a packet integration device.

Next, functional blocks included in the first packet integration device 120 will be described with reference to FIG. 2. While the following description will be made using the first packet integration device 120 as an example, the second packet integration device 220 and the third packet integration device 320 have the same configurations as the first packet integration device 120, as described above. The second packet integration device 220 and the third packet integration device 320 also perform the same operation processes as the first packet integration device 120. Thus, detailed descriptions of the second packet integration device 220 and the third packet integration device 320 will be omitted.

Figure 2:
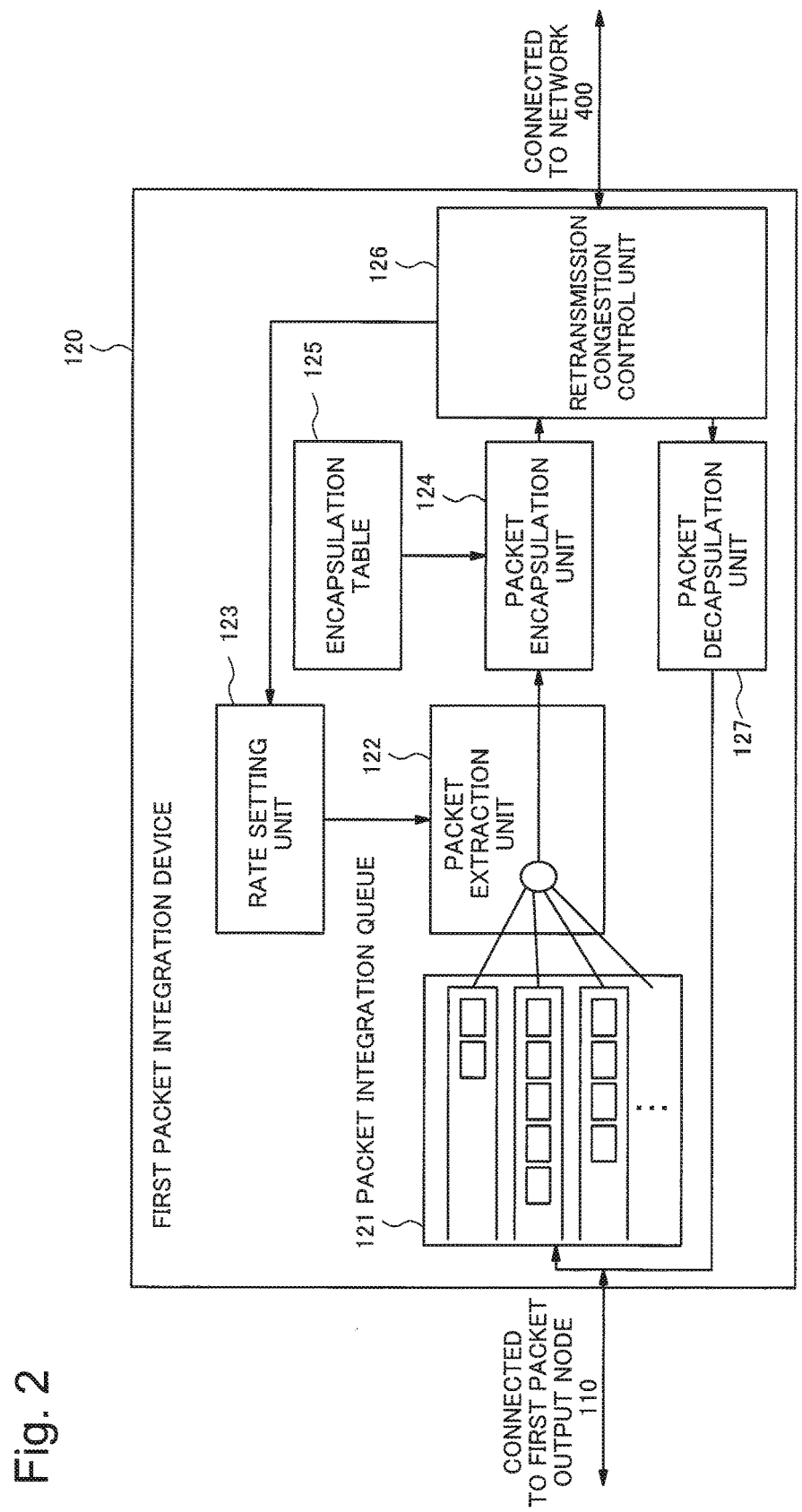
FIG. 2 is a block diagram illustrating a configuration of a packet integration device in the first exemplary embodiment of the present invention.

Referring to FIG. 2, the first packet integration device 120 includes a packet integration queue 121, a packet extraction unit 122, a rate setting unit 123, a packet encapsulation unit 124, an encapsulation table 125, a retransmission congestion control unit 126, and a packet decapsulation unit 127.

The packet integration queue 121 includes a plurality of internal queues each of which corresponds to a destination of packets. The packet integration queue 121 sorts packets that the first packet output node 110 has output in accordance with each destination and accumulates each packet in an internal queue corresponding to the destination of the packet.

The packet extraction unit 122 extracts a plurality of packets addressed to an identical destination, which have been accumulated in the packet integration queue 121.

The rate setting unit 123 sets a rate at which the packet extraction unit 122 performs packet extraction.

The packet encapsulation unit 124 encapsulates a plurality of packets addressed to an identical destination, which the packet extraction unit 122 has extracted, into a single packet.

The encapsulation table 125 holds information on destination addresses one of which is written in a header of an encapsulated packet when the packet encapsulation unit 124 encapsulates a plurality of packets addressed to an identical destination.

The retransmission congestion control unit 126 transmits packets, into each of which a plurality of packets are encapsulated, to the network 400 at such a rate that no congestion occurs on the network 400. In addition, the retransmission congestion control unit 126 receives packets, which are encapsulated by other packet integration devices other than the first packet integration device 120, by way of the network 400. The retransmission congestion control unit 126 transmits received packets to the packet decapsulation unit 127.

The packet decapsulation unit 127 receives packets, into each of which a plurality of packets are encapsulated, from the retransmission congestion control unit 126 and decapsulates the received packets to restore a plurality of original packets. The packet decapsulation unit 127 then transmits a plurality of restored packets to the first packet output node 110.

Next, the above-described respective components will be described in more detail.

First, the rate setting unit 123 will be described with reference to FIG. 3. The rate setting unit 123 sets the packet extraction unit 122 so that the packet extraction unit 122 operates in any one mode of three modes illustrated in FIG. 3 ((A): a physical link band mode 123-A, (B): a congestion control band mode 123-B, and (C): an individual flow band mode 123-C). Hereinafter, each of these modes will be described. In the following description, it is assumed that a "band" indicates a "transmission line capacity", which is a transferable bit rate.

<(A): Physical Link Band Mode 123-A>

In (A): the physical link band mode 123-A, the rate setting unit 123 sets the packet extraction unit 122 so that the packet extraction unit 122 extracts packets from the packet integration queue 121 in a round-robin fashion at a "band of a network link by which the retransmission congestion control unit 126 and the network 400 are connected to each other". Upon setting this mode, the rate setting unit 123 notifies the packet extraction unit 122 of the band of the network link by which the retransmission congestion control unit 126 and the network 400 are connected to each other.

<(B): Congestion Control Band Mode 123-B>

In (B): the congestion control band mode 123-B, the rate setting unit 123 sets the packet extraction unit 122 so that the packet extraction unit 122 extracts packets from the packet integration queue 121 in a round-robin fashion at either of the following rates, whichever is the slower. That is, the packet extraction unit 122 extracts packets at either "the total value of packet transmission rates each of which the retransmission congestion control unit 126 has set for each destination of packets" or the "band of the network link by which the retransmission congestion control unit 126 and the network 400 are connected to each other", whichever is the slower rate. Upon setting this mode, the rate setting unit 123 notifies the packet extraction unit 122 of "the total value of packet transmission rates each of which the retransmission congestion control unit 126 has set for each destination of packets" and the "band of the network link by which the retransmission congestion control unit 126 and the network 400 are connected to each other".

<(C): Individual Flow Band Mode 123-C>

In (C): the individual flow band mode 123-C, the rate setting unit 123 sets the packet extraction unit 122 to extract packets addressed to each destination from the packet integration queue 121 at "the same rate as a rate at which the retransmission congestion control unit 126 transmits packets to the destination". That is, in the above-described (A): the physical link band mode 123-A and (B): the congestion control band mode 123-B, packets are extracted in order at a predetermined rate regardless of which packet output node each packet is addressed to. While extraction rates for respective destinations are thus the same in these modes, packets are extracted at a different rate for each destination thereof in the individual flow band mode 123-C.

Specifically, in (C): the individual flow band mode 123-C, when, for example, rates at which packets are transmitted to a first destination and a second destination are a "rate A" and a "rate B", respectively, setting is performed in the following manner. That is, the setting is performed so that, for internal queues corresponding to the first destination and the second destination in the packet integration queue 121, packets are extracted at rates corresponding to the "rate A" and the "rate B", respectively. How the packet extraction unit 122 performs extraction specifically after setting has been done for each mode will be described later with reference to FIGS. 4 and 5. Upon setting this mode, the rate setting unit 123 notifies the packet extraction unit 122 of "rates at which the retransmission congestion control unit 126 transmits packets to respective destinations connected by way of the network 400".

Next, processing of the packet extraction unit 122 and internal queues in the packet integration queue 121 when any of these three modes is set will be described with reference to FIGS. 4 and 5.

Figure 4:
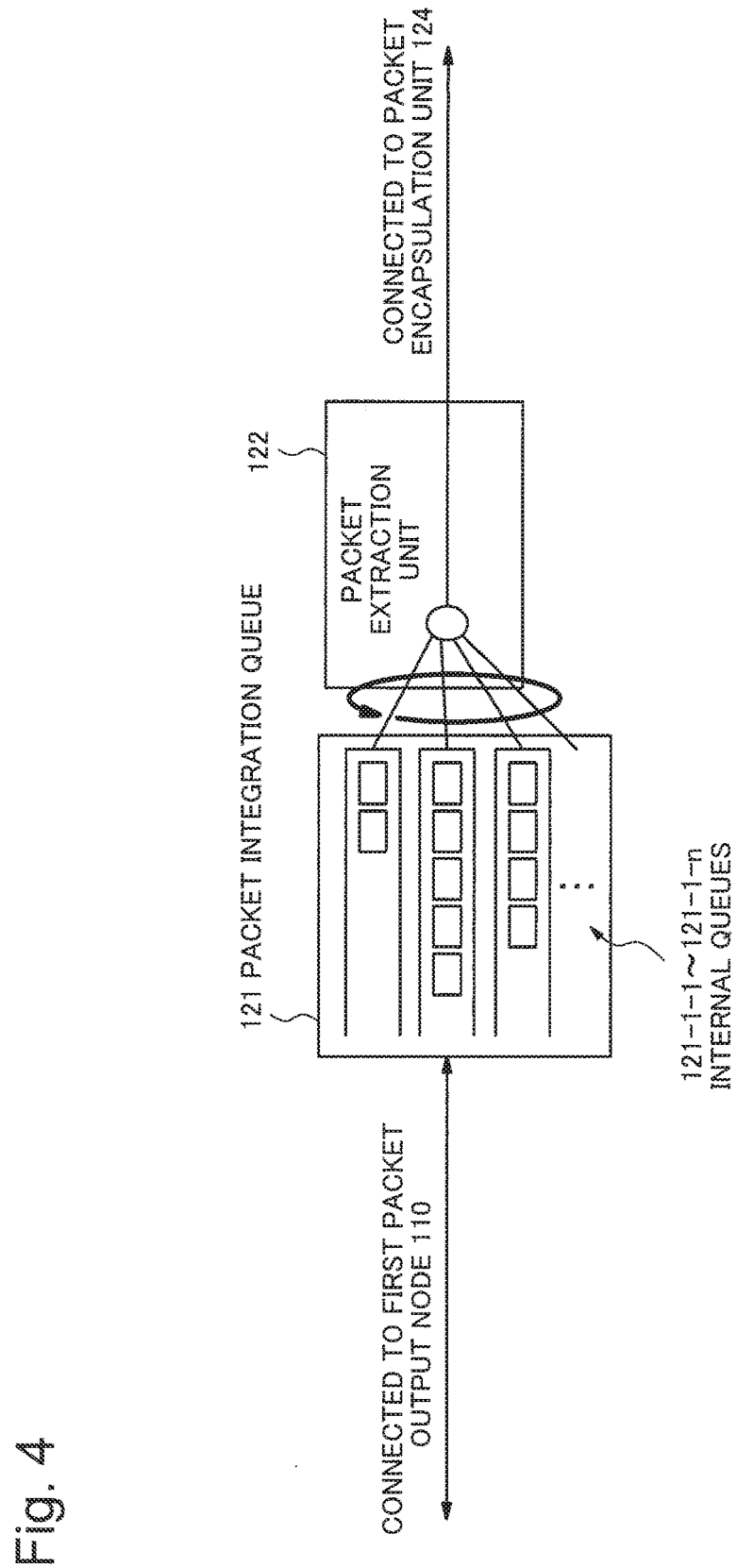
FIG. 4 is a block diagram illustrating a configuration of a packet integration queue and so on of the packet integration device in the first exemplary embodiment of the present invention.
Figure 5:
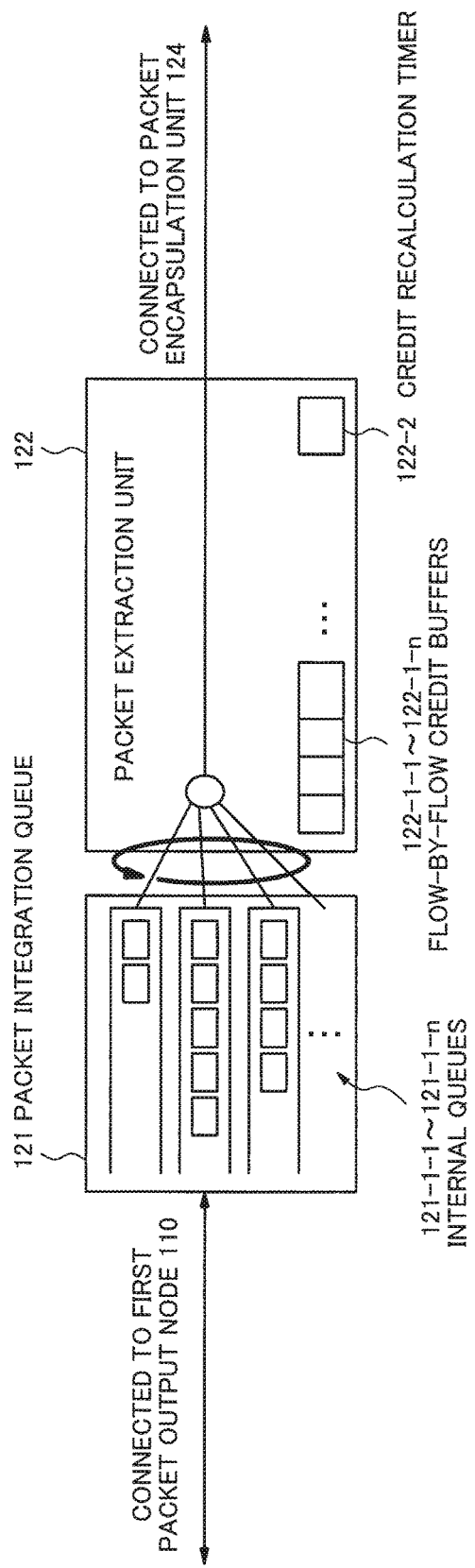
FIG. 5 is a block diagram illustrating a configuration of the packet integration queue and so on of the packet integration device in the first exemplary embodiment of the present invention.

Referring to FIGS. 4 and 5, the packet integration queue 121 holds as many internal queues 121-1 as the number of destination nodes to sort and accumulate packets, which the first packet output node 110 has output, in accordance with each destination. In FIGS. 4 and 5, internal queues 121-1-1 to 121-1-n are illustrated as the internal queues 121-1. In the drawings, "n", which is used in reference signs, is an integer greater than or equal to 2 and at least the same as the number of destination nodes. When, in the following description, description is made without particularly specifying any or all of the internal queues 121-1-l to 121-1-n, the internal queue(s) will be simply referred to as an "internal queue(s) 121-1".

The packet integration queue 121 sorts packets, which the first packet output node 110 has output, in accordance with each destination in the order of receipt and accumulates the packets in the internal queues 121-1 corresponding to respective destination nodes.

On the other hand, the packet extraction unit 122 operates in any mode, which has been set by the rate setting unit 123, of the above-described three modes.

When the packet extraction unit 122 is set to the above-described (A): the physical link band mode 123-A or (B): the congestion control band mode 123-B, the packet extraction unit 122 extracts packets from the packet integration queue 121 in a round-robin fashion at a rate (data capacity per unit time) that has been specified by the rate setting unit 123.

This feature will be described with reference to FIG. 4, which is a diagram that illustrates the packet extraction in a round-robin fashion. Referring to FIG. 4, in the packet extraction in a round-robin fashion, the packet extraction unit 122 searches the internal queues 121-1 in order with respect to each destination that the packet integration queue 121 holds. In the search, when packets addressed to an identical destination have been accumulated in a searched internal queue 121-1, the packet extraction unit 122 extracts all the accumulated packets and hands all the extracted packets to the packet encapsulation unit 124. However, when a size obtainable by totaling the sizes of respective packets accumulated in a searched internal queue 121-1 surpasses an upper limit of the size of the data portion in a packet, which is defined for the network 400, all the packets accumulated in the searched internal queue 121-1, even if they were extracted and encapsulated, could not be transmitted to the network 400. Thus, in such a case, only packets in such a number that the total value of the sizes of the packets to be extracted does not surpass the upper limit of the size of the data portion in a packet defined for the network 400 are extracted from the internal queue 121-1 in the packet integration queue 121. The "upper limit of the size of the data portion in a packet defined for the network 400" mentioned in the above and following descriptions indicates the data length of an area into which transmission data can be stored, which is calculated by subtracting a packet header length and the like defined for the network 400 from a maximum packet length defined for the network 400. As an alternative method, an upper limit of the total size of or an upper limit of the total number of packets to be extracted at a time from an internal queue 121-1 in the packet integration queue 121 may be determined in advance, and only packets may be extracted in such a number that the total size of or total number of the packets does not surpass the determined upper limit of the total size or total number.

Next, a case in which the packet extraction unit 122 is set to (C): the individual flow band mode 123-C will be described. In this case, at a "rate of transmission to the network 400 that the retransmission congestion control unit 126 has set for each destination", the packet extraction unit 122 extracts packets addressed to the destination from the packet integration queue 121.

The packet extraction at a "rate of transmission to the network 400 that the retransmission congestion control unit 126 has set for each destination" will now be described with reference to FIG. 5.

Referring to FIG. 5, the packet extraction unit 122 holds flow-by-flow credit buffers 122-1 and a credit recalculation timer 122-2 internally for an operation in (C): the individual flow band mode 123-C. In FIG. 5, flow-by-flow credit buffers 122-1-l to 122-1-n are illustrated as the flow-by-flow credit buffers 122-1. In the diagram, "n", which is used in reference signs, is an integer greater than or equal to 2 and at least the same as the number of destination nodes. When, in the following description, description is made without particularly specifying any or all of the flow-by-flow credit buffers 122-1-l to 122-1-n, the flow-by-flow credit buffer(s) will be simply referred to as a "flow-by-flow credit buffer(s) 122-1".

Each flow-by-flow credit buffer 122-1 holds an element corresponding to a destination with which the first packet output node 110 performs communication. Specifically, into a flow-by-flow credit buffer 122-1, credits corresponding to a transmission rate for each destination, which has been notified to the packet extraction unit 122 by the rate setting unit 123, are accumulated as the time passes. As used herein, credits are, for example, the total size of one or a plurality of packets that can be transmitted (that is, can be extracted) at the corresponding transmission rate. When packet extraction from an internal queue 121-1 is performed by the packet extraction unit 122, credits equivalent to the total size of extracted packets are subtracted from a value in a flow-by-flow credit buffer 122-1 corresponding to the same destination as that of the internal queue 121-1 from which the packets are extracted.

The credit recalculation timer 122-2 is a timer that is used to manage a period at which credits are accumulated in the flow-by-flow credit buffers 122-1.

The packet extraction unit 122 searches the internal queues 121-1 in the packet integration queue 121 by a cyclic check in a round-robin fashion. In the search, the packet extraction unit 122 refers to a flow-by-flow credit buffer 122-1 corresponding to a destination that corresponds to each internal queue 121-1. When the number of credits accumulated in the credit buffer 122-1 is greater than or equal to the total size of packets accumulated in the internal queue 121-1, the packet extraction unit 122 extracts all the accumulated packets from the internal queue 121-1. The packet extraction unit 122 hands all the extracted packets to the packet encapsulation unit 124. However, when the size obtainable by totaling the sizes of respective packets accumulated in a searched internal queue 121-1 surpasses the upper limit of the size of the data portion in a packet defined for the network 400, the packet extraction unit 122 could not transmit all the packets accumulated in the searched internal queue 121-1 to the network 400 even if the packets were extracted and encapsulated. Thus, in such a case, the packet extraction unit 122 extracts, from the internal queue 121-1 in the packet integration queue 121, only packets in such a number that the total value of the sizes of the packets to be extracted does not surpass the upper limit of the size of the data portion in a packet defined for the network 400. As an alternative method, an upper limit of the total size of or an upper limit of the total number of packets to be extracted at a time from an internal queue 121-1 in the packet integration queue 121 may be determined in advance, and only packets may be extracted in such a number that the total size of or total number of the packets does not surpass the determined upper limit of the total size or total number. The packet extraction unit 122, which has performed the extraction, subtracts the number of credits corresponding to the total size of a plurality of packets extracted from the internal queue 121-1 in the packet integration queue 121 from an element in the flow-by-flow credit buffers 122-1 corresponding to the destination of the packets.

Next, information included in the encapsulation table 125 will be described with reference to FIG. 6.

The encapsulation table 125 holds information on addresses each of which is written in the header of an encapsulated packet when packets that the first packet output node 110 has transmitted are encapsulated.

As illustrated in FIG. 6, the encapsulation table 125 stores destination addresses of packets that the first packet output node 110 has transmitted and destination addresses of packets that are used in encapsulation in association with each other. On this occasion, a packet destination address may be not only a single value but also a certain range of addresses. For example, a destination memory address used as a destination address in a packet on a PCI (Peripheral Component Interconnect) Express bus is an example. In such a case, it is also possible to store a certain range of addresses, which are destination addresses of packets, as an element of the packet destination address column in the encapsulation table 125 and to associate the range with an encapsulation address.

Figure 7:
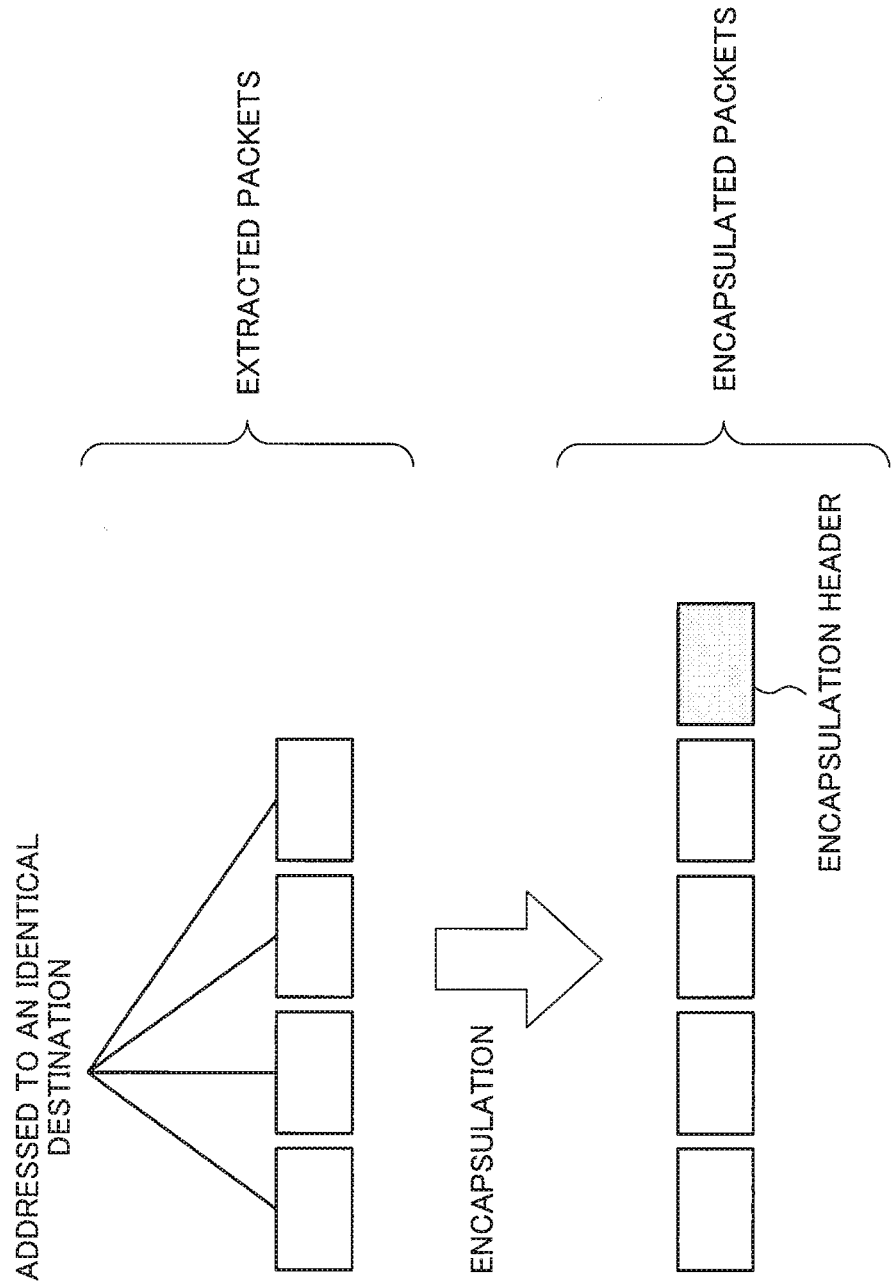
FIG. 7 is a schematic diagram for a description of encapsulation by the packet integration device in the first exemplary embodiment of the present invention.

The packet encapsulation unit 124 receives one or more packets the packet output nodes of which, which serve as destinations, are the same from the packet extraction unit 122 and refers to the encapsulation table 125. The packet encapsulation unit 124, using the destination of the packets received from the packet extraction unit 122 as a search key, searches the encapsulation table 125 for an address that is used in encapsulation. The packet encapsulation unit 124 integrates the one or more packets received from the packet extraction unit 122 and uses the integrated packet as a data portion in encapsulation, as illustrated in FIG. 7. The packet encapsulation unit 124, by adding an address for encapsulation, which has been searched for in the encapsulation table 125, to the data portion as an encapsulated header, generates an encapsulated packet. The packet encapsulation unit 124 hands the encapsulated packet to the retransmission congestion control unit 126.

The retransmission congestion control unit 126 transmits packets received from the packet encapsulation unit 124 to the network 400, adjusting a transmission rate so as not to cause congestion on the network 400. For this purpose, the retransmission congestion control unit 126 controls a rate at which packets are transmitted or the like for each destination connected to the network 400. The retransmission congestion control unit 126 notifies the rate setting unit 123 of all or a portion of information, such as a "packet transmission rate for each destination", "the total value of the packet transmission rates", and a "physical band of the network link connected to the network 400". When packets transmitted to the network 400 do not reach the destination thereof due to some conditions on the network 400, such as congestion and a bit error, the retransmission congestion control unit 126 retransmits those packets. The retransmission congestion control unit 126 also hands packets, into each of which a plurality of packets are encapsulated, received from the network 400 to the packet decapsulation unit 127. Such packets, into each of which a plurality of packets are encapsulated, are packets generated through encapsulation by another packet integration device connected to a packet output node that is the transmission source of the packets.

Next, a detailed operation of the exemplary embodiment of the present invention will be described with reference to the drawings. First, with reference to the block diagram in FIG. 2 and a flowchart in FIG. 8, an operation in which the first packet output node 110 transmits packets to the network 400 in the exemplary embodiment of the present invention will be described. Although, in the following description, an operation of the first packet output node 110 and first packet integration device 120 when the first packet output node 110 transmits packets to the network 400 will be described as an example, other packet output nodes and packet integration devices operate in the same manner in transmitting packets to the network 400.

Figure 8:
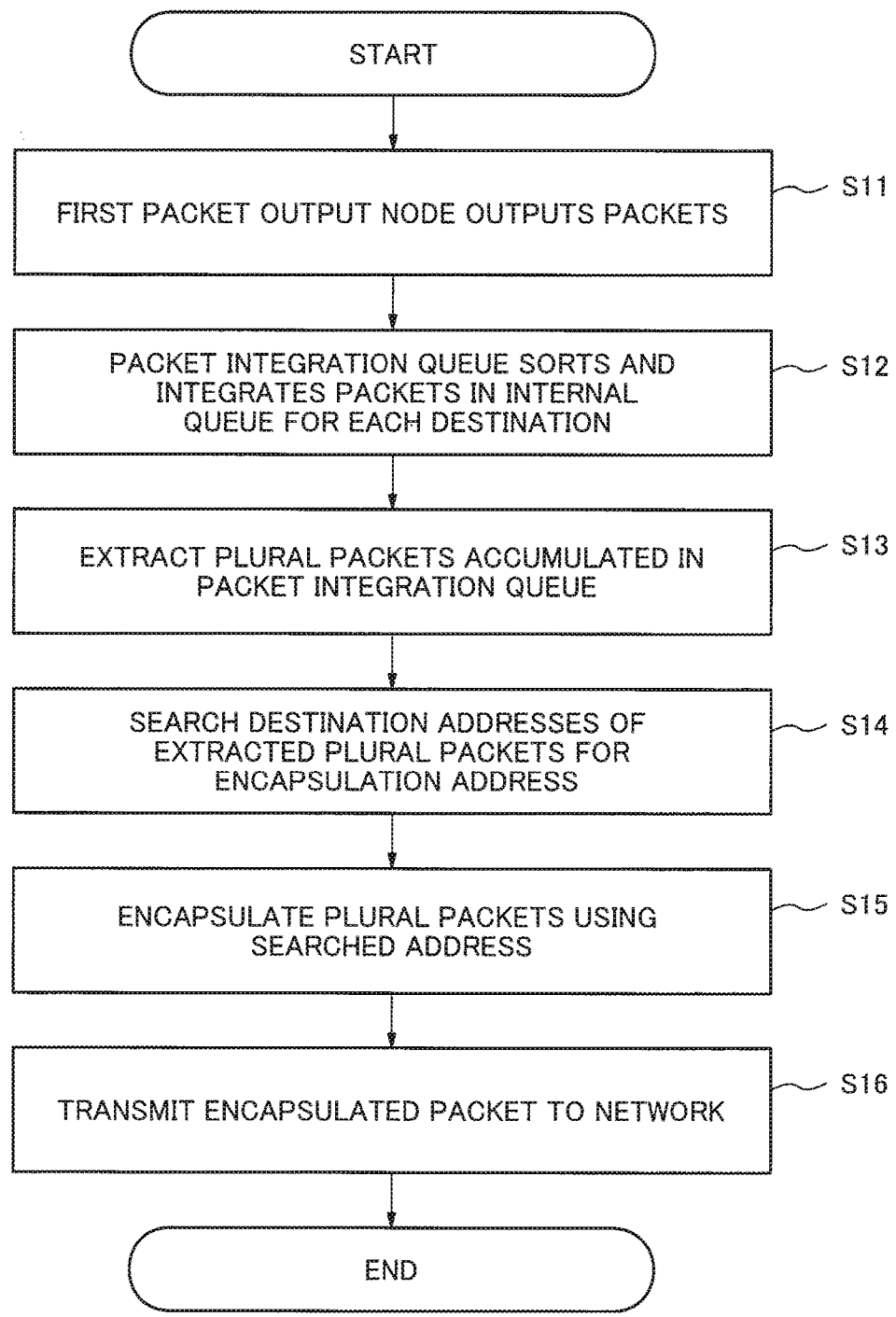
FIG. 8 is a flowchart (1/4) illustrating an operation of the first exemplary embodiment of the present invention.

FIG. 8 is a flowchart illustrating an operation in which the first packet output node 110 transmits packets to the network 400.

First, the first packet output node 110 outputs packets (step S11).

Next, the packet integration queue 121 receives packets from the first packet output node 110 and accumulates the received packets in the internal queues 121-1 each corresponding to packet output nodes that are the destinations of the received packets (step S12).

Subsequently, the packet extraction unit 122 operates in any of the above-described three modes ((A): the physical link band mode 123-A, (B): the congestion control band mode 123-B, and (C): the individual flow band mode 123-C). When in (A): the physical link band mode 123-A or (B): the congestion control band mode 123-B, the packet extraction unit 122 searches the internal queues 121-1 in the packet integration queue 121 by a cyclic check in a round-robin fashion. The packet extraction unit 122 extracts all packets addressed to an identical destination that have been accumulated in an internal queue 121-1 being searched (step S13).

However, when the size obtainable by totaling the sizes of respective packets accumulated in a searched internal queue 121-1 surpasses the upper limit of the size of the data portion in a packet defined for the network 400, all the packets accumulated in the searched internal queue 121-1 could not be transmitted to the network 400 even if the packets were extracted and encapsulated. Thus, in such a case, the packet extraction unit 122 extracts, from the internal queue 121-1 in the packet integration queue 121, only packets in such a number that the total value of the sizes of the packets to be extracted does not surpass the upper limit of the size of the data portion in a packet defined for the network 400. As an alternative method, an upper limit of the total size of or an upper limit of the total number of packets to be extracted at a time from an internal queue 121-1 in the packet integration queue 121 may be determined in advance. On that basis, only packets may be extracted in such a number that the total size of or total number of the packets does not surpass the determined upper limit of the total size or total number.

In an operation in (C): the individual flow band mode 123-C, the packet extraction unit 122 also searches the internal queues 121-1 in the packet integration queue 121 by a cyclic check in a round-robin fashion. With regard to an internal queue 121-1 currently being searched, the total size of packets addressed to an identical destination that are accumulated in the internal queue 121-1 at the time and residual credits written in an element of the flow-by-flow credit buffer 122-1 corresponding to the destination are compared with each other. When, as a result of the comparison, the number of residual credits is greater than or equal to the total size of accumulated packets, the packet extraction unit 122 extracts all the packets from the internal buffer currently being searched in the packet integration queue 121 (step S13). However, when the size obtainable by totaling the sizes of respective packets addressed to an identical destination accumulated in the internal queue 121-1 surpasses the upper limit of the size of the data portion in a packet defined for the network 400, the packet extraction unit 122 compares the total size of packets in such a number that the total size of the packets does not surpass the upper limit with the element in the flow-by-flow credit buffer 122-1. With this operation, the packet extraction unit 122 decides whether or not to extract packets. In the case of a decision to extract packets, the packet extraction unit 122 extracts only packets in such a number that the total size of the packets does not surpass the upper limit. As an alternative method, an upper limit of the total size of or an upper limit of the total number of packets to be extracted at a time from an internal queue 121-1 in the packet integration queue 121 may be determined in advance. Only packets may be extracted in such a number that the total size of or total number of the packets does not surpass the determined upper limit of the total size or total number. In this case, the packet extraction unit 122 compares a size obtainable by totaling the sizes of respective packets the total size of which does not surpass the upper limit with a corresponding element in the flow-by-flow credit buffer 122-1 and, when the number of residual credits is greater than or equal to the total size of the packets, extracts the packets the total size of which does not surpass the upper limit from the internal queue 121-1. In both cases, the packet extraction unit 122, which has performed extraction, subtracts the number of credits equivalent to the total size of a plurality of packets that have been extracted from the internal queue 121-1 in the packet integration queue 121 from an element of the flow-by-flow credit buffer 122-1 corresponding to the destination of the packets.

Next, referring to the encapsulation table 125, the packet encapsulation unit 124, using the destination address of one or more packets received from the packet extraction unit 122 as a search key, searches for an encapsulation address that corresponds to the one or more packets received from the packet extraction unit 122 (step S14).

Subsequently, using the searched address, the packet encapsulation unit 124 encapsulates the one or more packets received from the packet extraction unit 122 into a single packet, as illustrated in FIG. 7 (step S15). An encapsulation header is used for the encapsulation of the one or more packets, and the address that has been searched for in step S14 is used for a destination address in the encapsulation header.

Subsequently, the retransmission congestion control unit 126 receives a packet from the packet encapsulation unit 124 and transmits the packet to the network 400 at a transmission rate that is determined for each destination packet output node (step S16).

Next, with reference to FIGS. 4 and 9, an operation of the packet extraction unit 122 when the packet extraction unit 122 is set to either (A): the physical link band mode 123-A or (B): the congestion control band mode 123-B will be described. Such an operation is equivalent to the operation in step S13 among the operations illustrated in FIG. 8.

Figure 9:
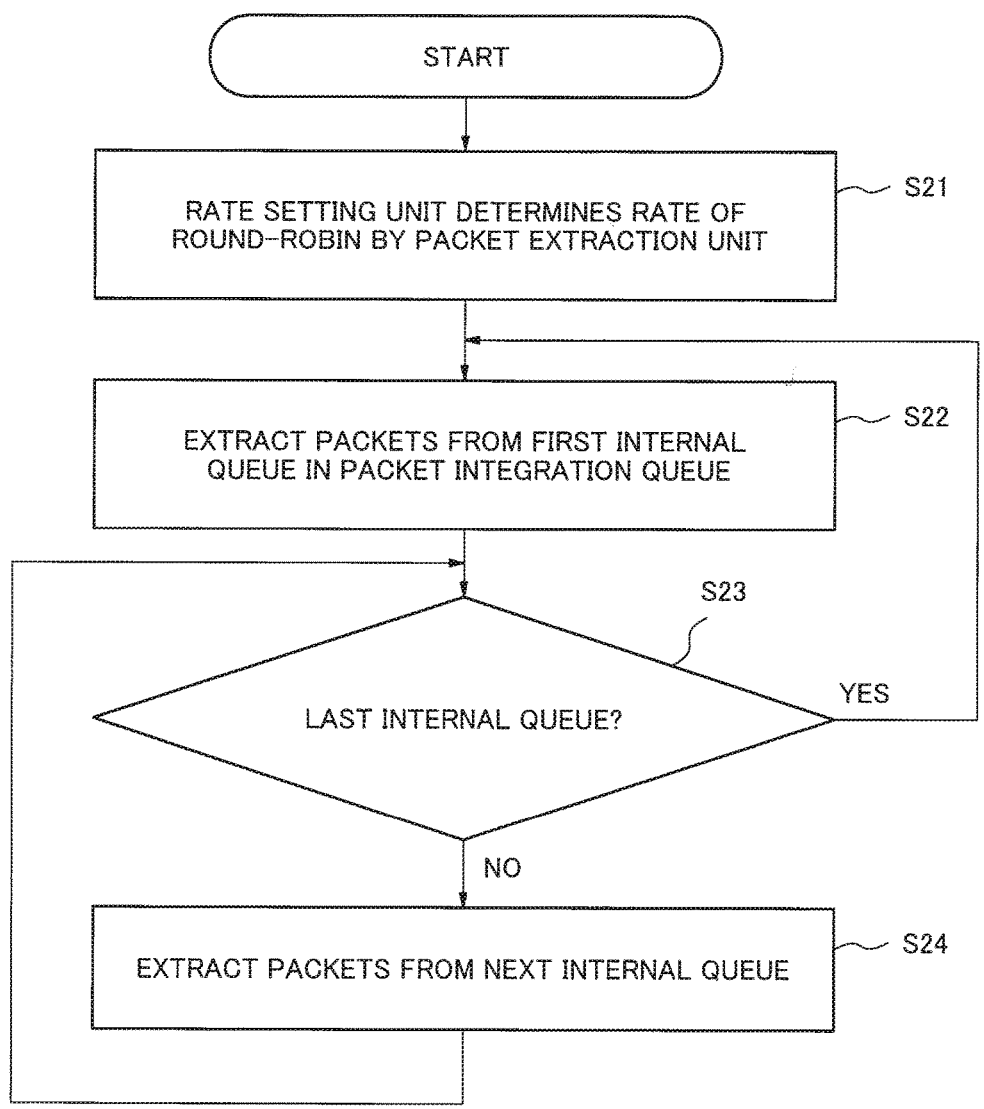
FIG. 9 is a flowchart (2/4) illustrating an operation of the first exemplary embodiment of the present invention.

FIG. 9 is a flowchart illustrating an operation of the packet extraction unit 122 when the packet extraction unit 122 is set to either (A): the physical link band mode 123-A or (B): the congestion control band mode 123-B.

First, the rate setting unit 123 determines a rate (amount of extracted data per unit time) at which the packet extraction unit 122 operates in a round-robin fashion (step S21). In (A): the physical link band mode 123-A, the rate of round-robin operation is equivalent to a band of the network link by which the retransmission congestion control unit 126 is connected to the network 400. On the other hand, in (B): the congestion control band mode 123-B, the rate of round-robin operation is equivalent to either "the total value of packet transmission rates each of which the retransmission congestion control unit 126 has set for each destination of packets" or a "band of the network link by which the retransmission congestion control unit 126 and the network 400 are connected to each other", whichever is the slower rate.

Next, the packet extraction unit 122 refers to the first internal queue 121-1 in the packet integration queue 121, extracts all packets accumulated in the queue, and hands the packets to the packet encapsulation unit (step S22). However, when the size obtainable by totaling the sizes of respective packets addressed to an identical destination that have been accumulated in the internal queue 121-1 surpasses the upper limit of the size of the data portion in a packet defined for the network 400, the packet extraction unit 122 compares the total size of packets in such a number that the total size of the packets does not surpass the upper limit with an element of the flow-by-flow credit buffer 122-1. On the basis of a result of the comparison, the packet extraction unit 122 decides whether or not to extract packets. In the case of a decision to extract packets, the packet extraction unit 122 extracts only packets in such a number that the total size of the packets does not surpass the upper limit. As an alternative method, an upper limit of the total size of or an upper limit of the total number of packets to be extracted at a time from the internal queue 121-1 in the packet integration queue 121 may be determined in advance, and only packets may be extracted in such a number that the total size of or total number of the packets does not surpass the determined upper limit of the total size or total number.

Next, the packet extraction unit 122 confirms whether or not the internal queue 121-1 from which packets were extracted in step S22 of the current round is the last internal queue 121-1 that the packet integration queue 121 holds (step S23). When, as a result of the confirmation, the internal queue 121-1 from which packets were extracted in step S22 of the current round does not apply to the last internal queue 121-1 (No in step S23), the packet extraction unit 122 extracts packets from a queue succeeding the internal queue 121-1 from which packets were extracted in step S22 of the current round (step S24). An operation in step S24 is the same as the operation of packet extraction in step S22. Subsequently, the packet extraction unit 122 returns to step S23 and continues the operation. As described above, repeating steps S23 and S24 thereafter causes the packet extraction to be repeated to the last internal queue 121-1 that the packet integration queue 121 holds.

When the packet extraction reaches the last internal buffer (Yes in step S23), return to step S22 brings a turn extracting packets back to the first internal queue 121-1 in the packet integration queue 121.

Thereafter, step S22 and the subsequent steps are repeated. In (B): the congestion control band mode 123-B, the rate of round-robin operation performed by the packet extraction unit 122, which was determined in step S21, can be updated at every predetermined period. In that case, for the calculation of an updated value of the rate, transmission rates at the time, each of which is determined by the retransmission congestion control unit 126 for each destination, are used. The packet extraction unit 122 repeats the round-robin operation at either "the total value of packet transmission rates at the time each of which the retransmission congestion control unit 126 has set for each destination of packets" or the "band of the network link by which the retransmission congestion control unit 126 and the network 400 are connected to each other", whichever is the slower rate.

Next, with reference to FIGS. 5, 10, and 11, an operation of the packet extraction unit 122 when the packet extraction unit 122 is set to (C): the individual flow band mode 123-C will be described. Such an operation is equivalent to the operation in step S13 among the operations illustrated in FIG. 8.

Figure 10:
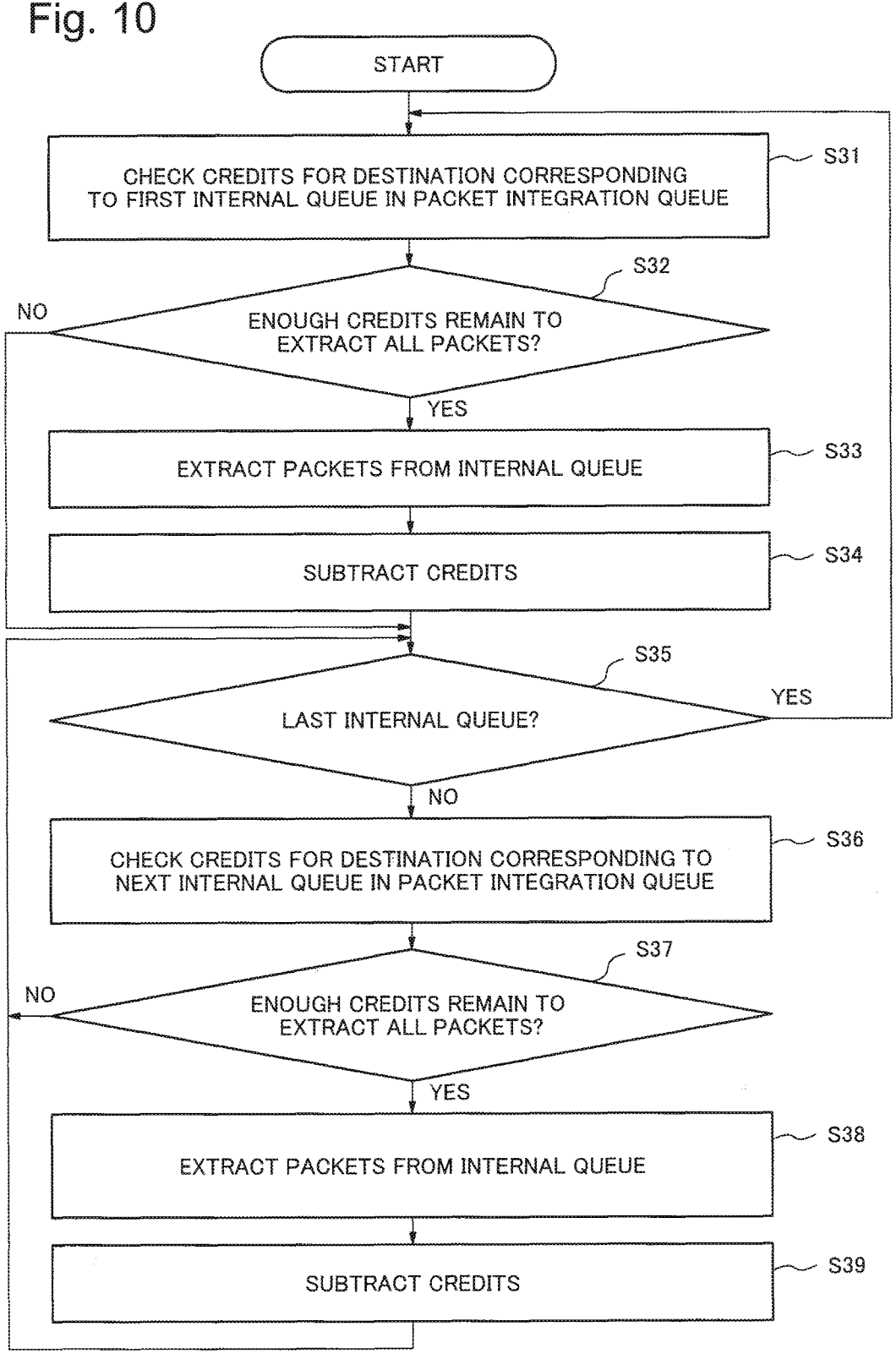
FIG. 10 is a flowchart (3/4) illustrating an operation of the first exemplary embodiment of the present invention.

FIG. 10 is a flowchart illustrating an operation of the packet extraction unit 122 when the packet extraction unit 122 is set to (C): the individual flow band mode 123-C. FIG. 11 is a flowchart illustrating an operation in which the packet extraction unit 122 updates credits in the flow-by-flow credit buffer 122-1.

The packet extraction unit 122 checks residual credits for a destination corresponding to the first internal queue 121-1 in the packet integration queue 121 by means of referring to an element of the flow-by-flow credit buffer 122-1 corresponding to the destination (step S31).

Subsequently, when the number of the checked credits is greater than or equal to the total size of packets accumulated in the first internal queue 121-1 in the packet integration queue 121 (Yes in step S32), the packet extraction unit 122 extracts all the packets from the internal queue 121-1 (step S33).

The packet extraction unit 122 subtracts the number of credits equivalent to the total size of the extracted packets from the element of the flow-by-flow credit buffer 122-1 corresponding to the destination (step S34). As described earlier in the description of the configuration of the flow-by-flow credit buffer 122-1 and the description of step S13, packets that the packet extraction unit 122 extracts from an internal buffer in the packet integration queue 121 are not always all packets that have been accumulated in the internal queue 121-1, and there is a case in which only packets are extracted in such a number that the total size of the packets to be extracted does not surpass a maximum packet length defined for the network 400 or the total size of or total number of the packets does not surpass a predetermined total size or total number. Such an operation is the same as the operation described in step S13. In that case, it is assumed that the number of credits that the packet extraction unit 122 subtracts from the element of the flow-by-flow credit buffer 122-1 corresponding to the destination is the number of credits equivalent to the total size of packets that the packet extraction unit 122 has actually extracted instead of all the packets accumulated in the internal queue 121-1. In this case, in step S32, the packet extraction unit 122 may be configured to determine "Yes in step S32" if the number of credits that is greater than or equal to the total size of packets to be actually extracted, instead of all the packets accumulated in the internal queue 121-1, remains.

Subsequently, the packet extraction unit 122 confirms whether or not the internal queue 121-1 from which packets have been extracted is the last internal queue 121-1 that the packet integration queue 121 holds (step S35). If not the last queue (No in step S35), the packet extraction unit 122 refers to an element of the flow-by-flow credit buffer 122-1 corresponding to the destination of a succeeding internal queue 121-1 to check the number of credits in the element (step S36).

Next, when the number of checked credits is greater than or equal to the total size of packets accumulated in the internal queue 121-1 in the packet integration queue 121 for the destination corresponding to the checked credits (Yes in step S37), the packet extraction unit 122 extracts all the packets from the internal queue 121-1 (step S38).

The packet extraction unit 122 then subtracts the number of credits equivalent to the total size of the extracted packets from the element of the flow-by-flow credit buffer 122-1 corresponding to the destination (step S39). In this operation, a feature that packets that the packet extraction unit 122 extracts from an internal buffer in the packet integration queue 121 are not always all packets accumulated in the internal queue 121-1 and there is a case in which only packets are extracted in such a number that the total size of the packets to be extracted does not surpass the maximum packet length of the data portion in a packet defined for the network 400 or the total size of or total number of the packets does not surpass a predetermined total size or total number is the same as that of the operation in step S33. In addition, a feature that, in such a case, the packet extraction unit 122 may be configured to subtract only the number of credits equivalent to actually extracted packets and to determine "Yes in step S36" if the number of credits greater than or equal to the total size of packets to be actually extracted remains is also the same as steps S32 and S33.

Subsequently, the packet extraction unit 122 returns the process to step S35. The packet extraction unit 122 repeats operations in steps S35 to S39 until the internal queue subjected to the operations reaches the last internal queue 121-1 that the packet integration queue 121 holds, that is, until it is determined Yes in step S35. The packet extraction unit 122, after reaching the last internal buffer (Yes in step S35), returning to the first internal buffer that the packet integration queue 121 holds brings a turn extracting packets back to the first internal queue 121-1 in the packet integration queue 121. Thereafter, the operations in steps S31 to S39 are repeated in the same manner as the above-described operations.

On the other hand, in parallel with performing operations of extracting packets received from the first packet output node 110 and handing the extracted packets to the packet encapsulation unit 124 through the above-described operations in steps S31 to S39, the packet extraction unit 122 performs an operation of updating the flow-by-flow credit buffer 122-1 periodically. The operation of updating the flow-by-flow credit buffer 122-1 periodically will be described with reference to a flowchart in FIG. 11.

Figure 11:
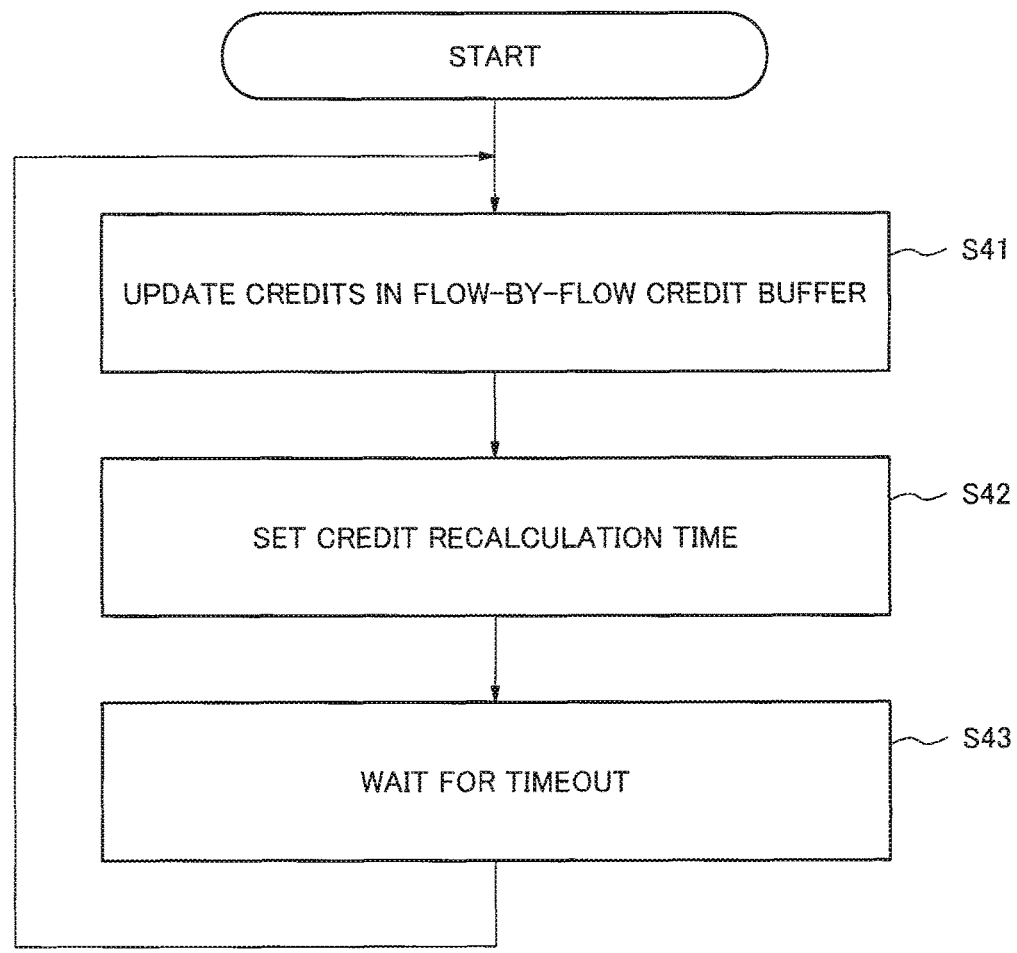
FIG. 11 is a flowchart (4/4) illustrating an operation of the first exemplary embodiment of the present invention.

Referring to FIG. 11, the packet extraction unit 122 first receives, from the rate setting unit 123, transmission rates each of which the retransmission congestion control unit 126 has set for each destination node. The packet extraction unit 122 updates the flow-by-flow credit buffer 122-1, using the numbers of credits each of which depends on a transmission rate to each destination (step S41).

Next, the packet extraction unit 122 sets the credit recalculation timer 122-2 to a predetermined value (step S42).

Subsequently, the packet extraction unit 122 waits for a timeout of the credit recalculation timer 122-2 (step S43) and, after a timeout, returns to step S41. In the operation in step S41 performed subsequently, the packet extraction unit 122 receives, from the rate setting unit 123, new transmission rates each of which the retransmission congestion control unit 126 has set for each destination at the time and uses the received values in the credit calculation. Repetition of these steps by the packet extraction unit 122 enables periodical updates of the flow-by-flow credit buffer 122-1 to be achieved.

In the exemplary embodiment described thus far, the packet extraction unit searches internal buffers in the packet integration queue 121 in a round-robin fashion, extracts and encapsulates all packets accumulated in each of the searched internal buffers using the maximum number of packets allowable for the network as an upper limit, and transmits the encapsulated packet to the network.

Employing such a configuration enables packets accumulated in the packet integration queue to be transmitted to the network, without causing a transmission delay to the packets, immediately when a corresponding internal queue becomes subject to search by the packet extraction unit 122 in a round-robin fashion.

The number of packets to be encapsulated is the number of packets that have been accumulated in an internal buffer in the packet integration queue 121 at the time, and the number of packets to be integrated in an encapsulation can be set automatically.

Furthermore, integrating and encapsulating a plurality of packets and transmitting the encapsulated packet to the network through these operations enables an overhead on a network bandwidth caused by encapsulation headers to be reduced, compared with a case in which packets are individually encapsulated and transmitted to the network. Therefore, wideband packet transmission can be achieved.

Although the above-described exemplary embodiment is a suitable exemplary embodiment for the present invention, the scope of the present invention is not limited to only the above-described exemplary embodiment and the present invention can be embodied with various modifications without departing from the scope of the present invention.

Figure 3:
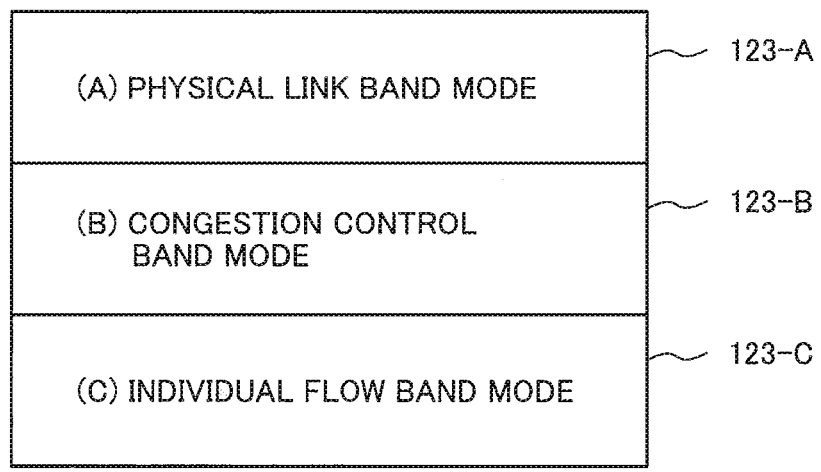
FIG. 3 is a schematic diagram illustrating three modes in the first exemplary embodiment of the present invention.

For example, in the above description, three modes, illustrated in FIG. 3 or the like, was provided, and the packet extraction unit 122 was set to any of the three modes. However, the packet extraction unit 122 does not always have to be configured like the above and may be configured to operate at another rate other than the rates defined in respective ones of the three modes. That is, another mode other than the three modes, illustrated in FIG. 3, may be provided. All the three modes do not always have to be provided. For example, only one mode may be provided.

Figure 12:
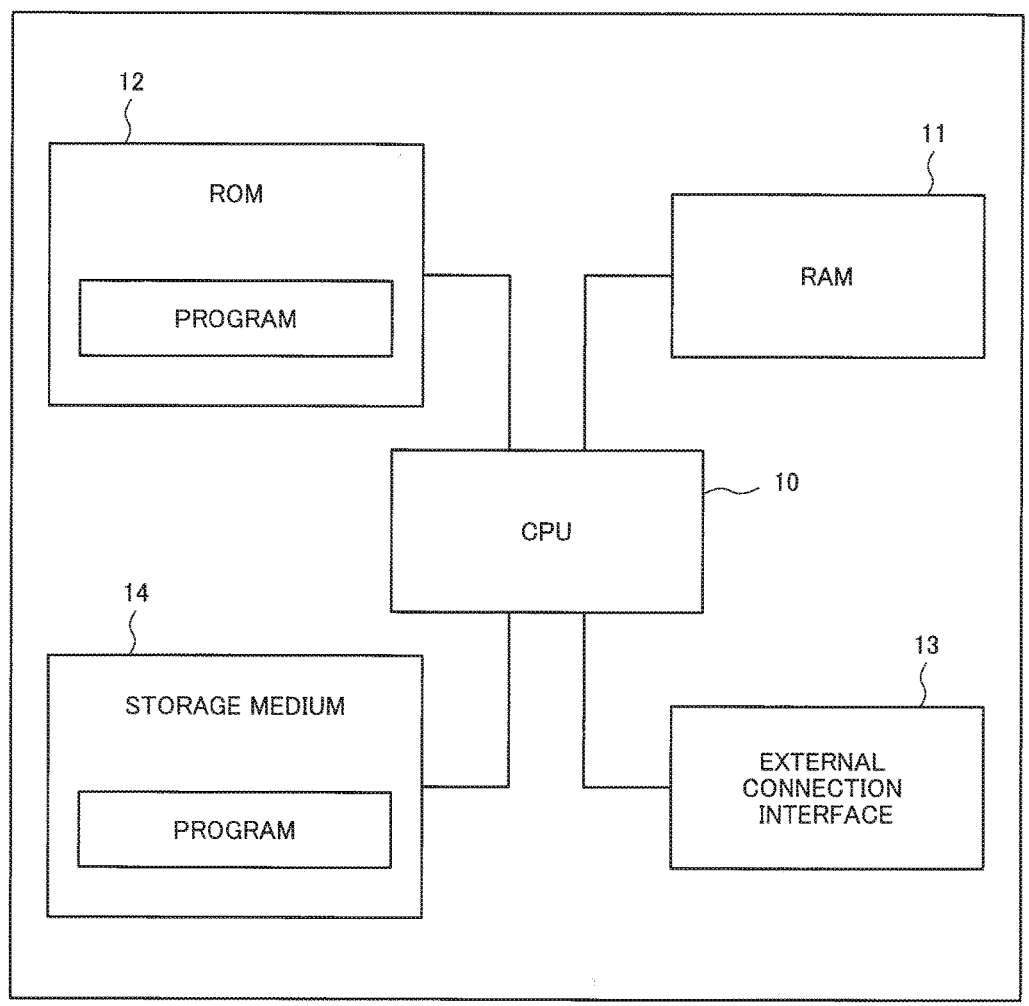
FIG. 12 is a diagram exemplifying a hardware configuration of the packet integration devices in respective exemplary embodiments of the present invention.

Each of the respective packet output nodes and packet integration devices, which were described above, can be achieved by hardware, software, or a combination thereof. Each component of a packet output node and a packet integration device illustrated in FIG. 2 or the like is achieved by, for example, hardware resources exemplified in FIG. 12. That is, a configuration illustrated in FIG. 12 includes a CPU (Central Processing Unit) 10, a RAM (Random Access Memory) 11, a ROM (Read Only Memory) 12, an external connection interface 13, and a storage medium 14. The CPU 10, by means of reading out various software programs (computer programs) stored in the ROM 12 or the storage medium 14 onto the RAM 11 and executing the read-out programs, controls overall operations of the packet output node and the packet integration device. A packet transmission method performed by each of the packet output nodes and the packet integration devices, which were described above, can also be achieved by hardware, software, or a combination thereof. As used herein, the expression "achieved by software" means that the method is achieved by a computer reading a program and executing the read program.

The programs can be stored in various types of non-transitory computer readable media and supplied to a computer. The non-transitory computer readable media include various types of tangible storage media. Examples of the non-transitory computer readable media include a magnetic storage medium (for example, flexible disk, magnetic tape, and hard disk drive), a magneto optical storage medium (for example, magneto optical disk), a CD-ROM (Read Only Memory), a CD-R, a CD-R/W, a semiconductor memory (for example, mask ROM, PROM (Programmable ROM), EPROM (Erasable PROM), flash ROM, RAM (random access memory)). The programs may also be supplied to a computer by means of various types of transitory computer readable media. Examples of the transitory computer readable media include an electrical signal, an optical signal, and electromagnetic waves. The transitory computer readable media are capable of supplying the programs to a computer by way of a wired communication path, such as an electric wire and an optical fiber, or a wireless communication path.

The exemplary embodiment of the present invention as described thus far has advantageous effects as described below.

A first advantageous effect is that integrating and encapsulating a plurality of packets and transmitting the encapsulated packet to a network without causing a delay to the packets enables a wideband packet transmission system to be achieved.

That is because a plurality of packets addressed to an identical destination that have been accumulated in a buffer for packet accumulation when the buffer is searched are integrated and encapsulated.

A second advantageous effect is that a wideband packet transmission system in which the number of packets to be integrated can be set automatically and parameter setting is not required can be achieved.

The reason for the second advantageous effect is the same as that of the first advantageous effect.

Second Exemplary Embodiment

Figure 13:
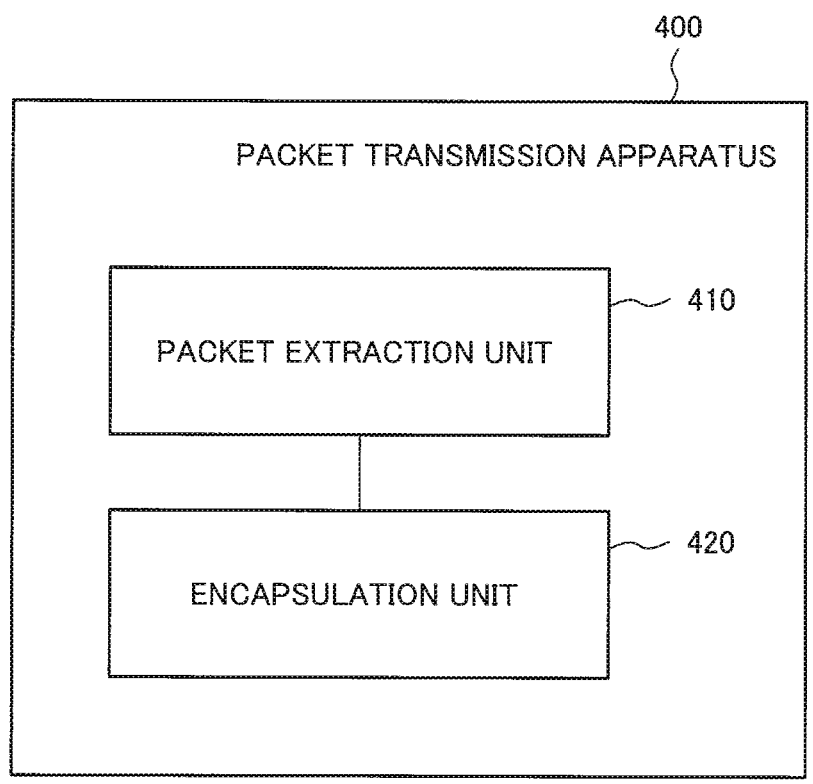
FIG. 13 is a block diagram illustrating a configuration of a packet transmission apparatus in a second exemplary embodiment of the present invention.
Figure 14:
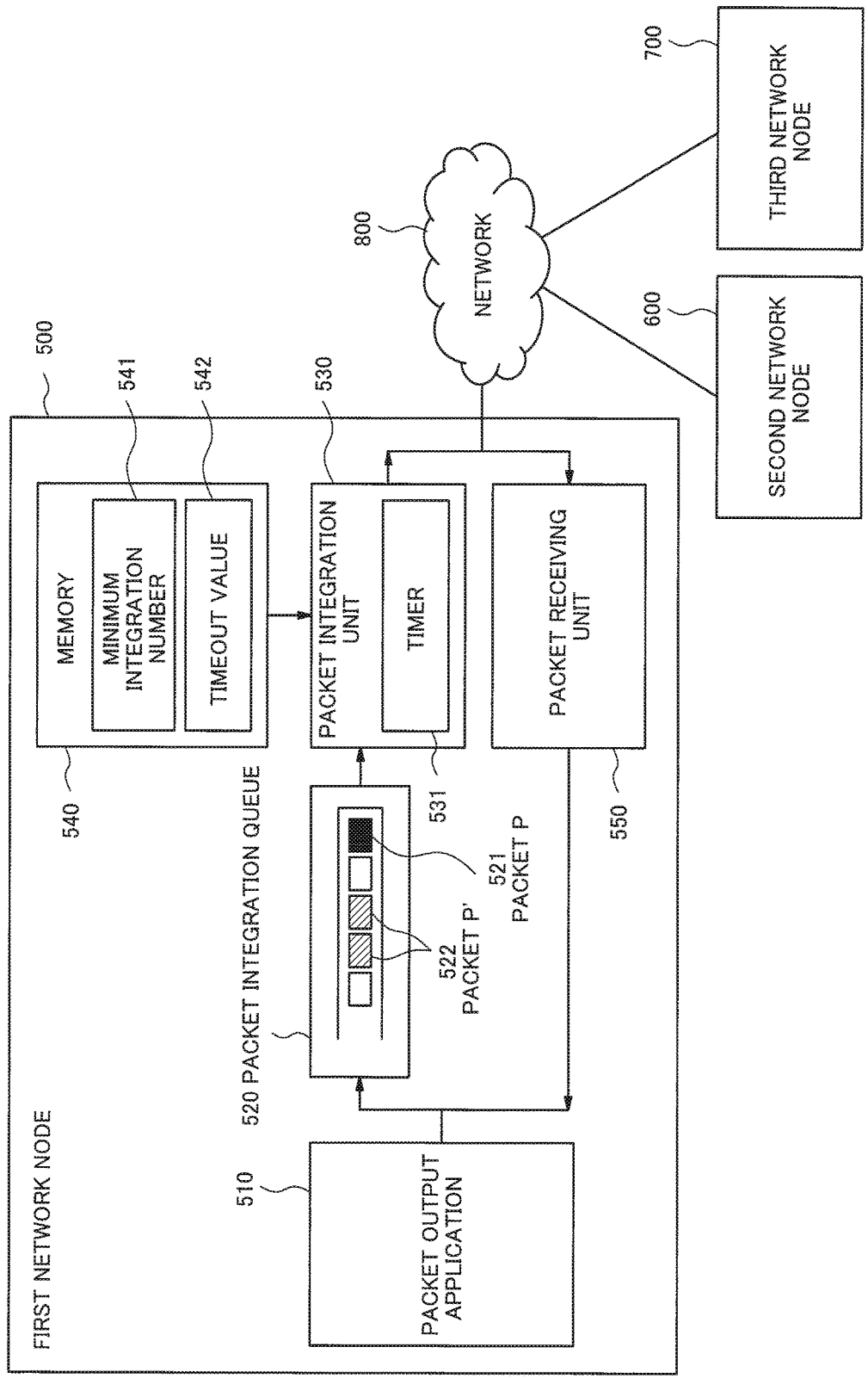
FIG. 14 is a block diagram illustrating a basic configuration of a general technology.
Figure 15:
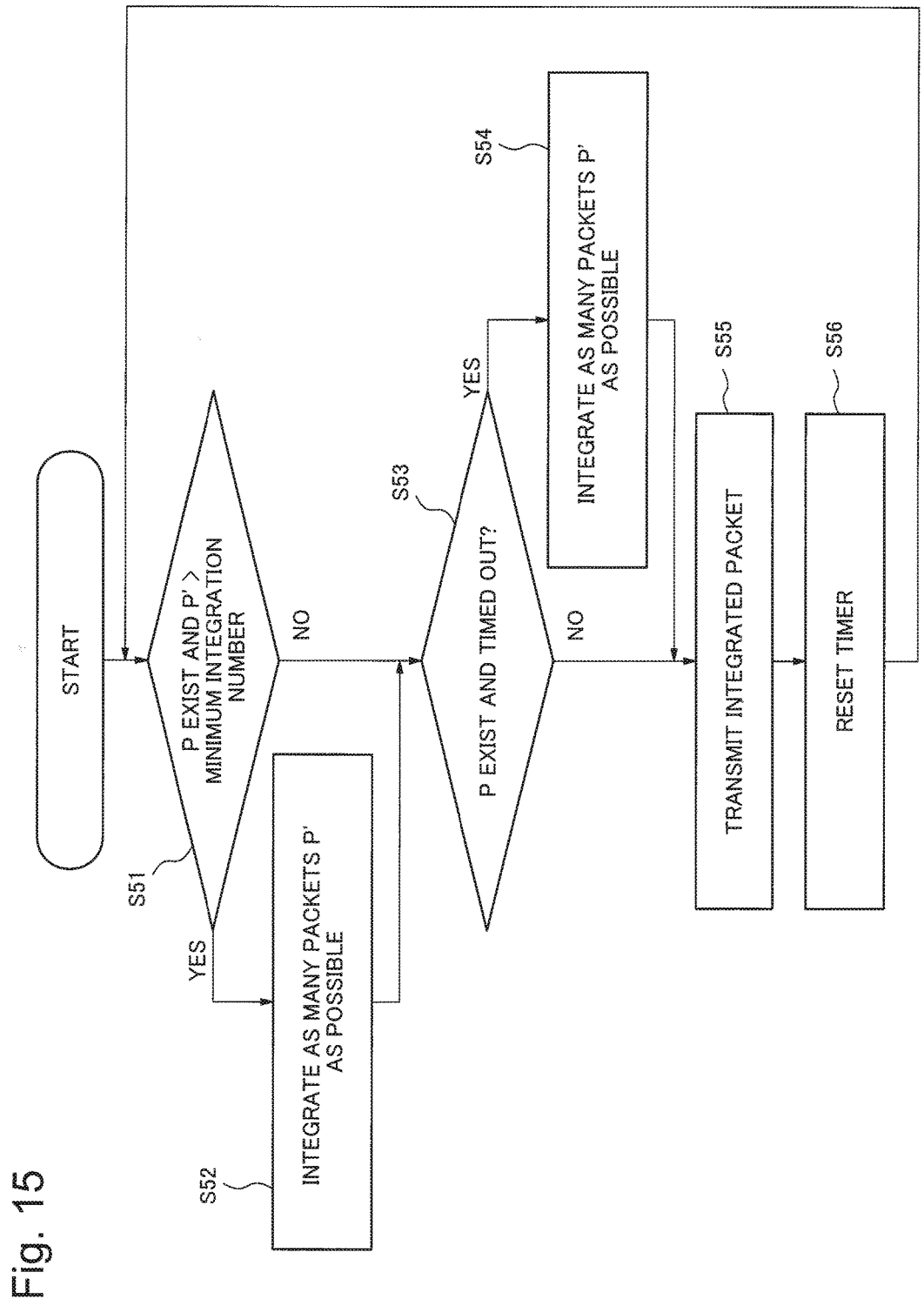
FIG. 15 is a flowchart illustrating an operation of the general technology.

FIG. 13 is a block diagram illustrating a configuration of a packet transmission apparatus 400 according to a second exemplary embodiment of the present invention. As illustrated in FIG. 13, the packet transmission apparatus 400 includes a packet extraction unit 410 and an encapsulation unit 420.

The packet extraction unit 410 searches a buffer, which is configured to sort and accumulate packets in accordance with each destination, for packets with respect to each destination and extracts packets addressed to an identical destination from the buffer and, when a plurality of packets addressed to an identical destination are accumulated, extracts the plurality of packets from the buffer.

The encapsulation unit 420 encapsulates packets extracted by the packet extraction unit 410 into a single packet with respect to each destination.

According to the second exemplary embodiment, employing the above-described configuration enables transmission delay caused by packet integration to be suppressed and wideband transmission to be performed.

All or part of the exemplary embodiments described above may be described as in the following supplementary notes, but the present invention is not limited thereto.

(Supplemental note 1) A packet transmission apparatus, including:

a packet extraction means for, when a plurality of packets addressed to an identical destination are accumulated in a buffer configured to sort and accumulate packets in accordance with each destination, extracting the plurality of packets all at a time, wherein the extraction is performed to encapsulate the packets extracted at a time into a single packet with respect to each destination and thereafter transmit the encapsulated packet to the destination.

(Supplemental note 2) The packet transmission apparatus according to Supplemental note 1, further including:

the buffer configured to sort and accumulate packets in accordance with each destination;

an encapsulation means for encapsulating all the packets extracted at a time by the packet extraction means into a single packet; and a transmission means for transmitting the encapsulated packet to the destination by way of a network.

(Supplemental note 3) The packet transmission apparatus according to Supplemental note 1 or 2, wherein the packet extraction means, by a cyclic check in a round-robin fashion, extracts packets addressed to respective destinations in order.

(Supplemental note 4) The packet transmission apparatus according to any one of Supplemental notes 1 to 3, further including:

determining a rate at which the packet extraction means performs the packet extraction based on a band of a network connected to the packet transmission apparatus.

(Supplemental note 5)

The packet transmission apparatus according to any one of Supplemental notes 1 to 3, wherein a rate at which the packet extraction means performs the packet extraction is determined based on either a total of transmission rates each of which is set for each destination connected to the packet transmission apparatus by way of a network or a band of the network connected to the packet transmission apparatus, whichever is the slower rate.

(Supplemental note 6) The packet transmission apparatus according to any one of Supplemental notes 1 to 3, wherein the packet extraction means, even when a plurality of packets addressed to an identical destination are accumulated, does not perform the extraction unless a predetermined condition is met that is defined on the basis of a transmission rate that is set for each destination, which is connected to the packet transmission apparatus by way of a network.

(Supplemental note 7) The packet transmission apparatus according to any one of Supplemental notes 1 to 3, being provided with a plurality of modes including at least a portion or all of the following three modes:

a first mode in which a rate at which the packet extraction means performs the packet extraction is determined on the basis of a band of a network link with a network that is connected to the packet transmission apparatus;

a second mode in which the rate at which the packet extraction means performs the packet extraction is determined on the basis of either a total of transmission rates each of which is set for each destination connected to the packet transmission apparatus by way of the network or the band of the network link with the network that is connected to the packet transmission apparatus, whichever is the slower rate; and a third mode in which the packet extraction means, even when a plurality of packets addressed to an identical destination are accumulated, does not perform the extraction unless a predetermined condition is met that is defined on the basis of a transmission rate that is set for each destination connected to the packet transmission apparatus by way of the network, the packet transmission apparatus operating by selecting any one mode of the provided modes.

(Supplemental note 8) The packet transmission apparatus according to any one of Supplemental notes 1 to 6, wherein packets addressed to an identical destination that the packet extraction means extracts at a time from the buffer are any of all packets accumulated in the buffer, packets in such a number that a total size of the packets to be extracted does not surpass a maximum packet size allowable for a data portion in a packet transmitted on a network connected to the packet transmission apparatus, packets in such a number that a total size of the packets to be extracted does not surpass a predetermined upper limit of a total size of packets, and packets in such a number that the total number of the packets to be extracted does not surpass a predetermined upper limit of the total number of packets.

(Supplemental note 9)

A packet transmission system including a plurality of packet transmission apparatuses, each of the packet transmission apparatuses including:

a packet extraction means for, when a plurality of packets addressed to an identical destination are accumulated in a buffer configured to sort and accumulate packets in accordance with each destination, extracting the plurality of packets all at a time, wherein the extraction is performed to encapsulate the packets extracted at a time into a single packet with respect to each destination and thereafter transmit the encapsulated packet to the destination.

(Supplemental note 10) A transmission method performed by a packet transmission apparatus, a packet transmission apparatus including:

a packet extraction step for, when a plurality of packets addressed to an identical destination are accumulated in a buffer configured to sort and accumulate packets in accordance with each destination, extracting the plurality of packets all at a time, wherein the extraction is performed to encapsulate the packets extracted at a time into a single packet with respect to each destination and thereafter transmit the encapsulated packet to the destination.

(Supplemental note 11) A packet transmission system, including:

a buffer means for sorting and accumulating packets in accordance with each destination;

a packet extraction means for searching packets accumulated in the buffer means with respect to each destination and extracting packets;

an encapsulation means for encapsulating one or a plurality of packets extracted by the packet extraction means into a single packet; and a transmission means for transmitting the encapsulated packet to a network, wherein the packet extraction means extracts a plurality of searched packets addressed to an identical destination all at a time.

(Supplemental note 12) The packet transmission system according to Supplemental note 11, wherein a method in which the packet extraction means searches packets accumulated in the buffer means with respect to each destination is a cyclic check of respective destinations in a round-robin fashion.

(Supplemental note 13) The packet transmission system according to Supplemental note 12, further including:

a first setting means for setting a rate at which the packet extraction means extracts packets in a round-robin fashion to a band of a network link by which the transmission means is connected to the network.

(Supplemental note 14) The packet transmission system according to Supplemental note 12, further including:

a second setting means for setting a rate at which the packet extraction means extracts packets in a round-robin fashion to either a total value of transmission rates each of which the transmission means has set for each destination connected to the network or a band of a network link by which the transmission means is connected to the network, whichever is the smaller.

(Supplemental note 15) The packet transmission system according to Supplemental note 12, further including:

a third setting means for setting an extraction rate at which the packet extraction means extracts packets addressed to each destination in a round-robin fashion so that each extraction rate coincides with a transmission rate that the transmission means has set for each destination connected to the network, wherein the packet extraction means further includes a credit buffer means for storing, as credits, a total size of a plurality of packets that can be extracted with respect to each destination.

(Supplemental note 16) The packet transmission system according to any one of Supplemental notes 13 to 15, wherein packets addressed to an identical destination that the packet extraction means extracts from the buffer means at a time are all packets accumulated in the buffer means, packets in such a number that a total size of packets to be extracted does not surpass a maximum packet size allowable for a network, or packets in such a number that a total size of or the total number of the packets does not surpass a predetermined total size of or the predetermined total number of packets.

(Supplemental note 17) A packet transmission method, including making:

a buffer means sort and accumulate packets in accordance with each destination;

a packet extraction means search packets accumulated in the buffer means with respect to each destination and extract a plurality of searched packets addressed to an identical destination all at a time;

an encapsulation means encapsulate one or a plurality of packets extracted by the packet extraction means into a single packet; and a transmission means transmit, to a network, a packet encapsulated by the encapsulation means.

(Supplemental note 18) The packet transmission method according to Supplemental note 17, wherein a method in which the packet extraction means is made to search packets accumulated in the buffer means with respect to each destination is a cyclic check of respective destinations in a round-robin fashion.

(Supplemental note 19) The packet transmission method according to Supplemental note 18, wherein:

a rate at which the packet extraction means is made to extract packets in a round-robin fashion is set to a band of a network link by which the transmission means is connected to the network.

(Supplemental note 20) The packet transmission method according to Supplemental note 18, wherein:

a rate at which the packet extraction means is made to extract packets in a round-robin fashion is set to either a total value of transmission rates each of which the transmission means has set for each destination connected to the network or a band of a network link by which the transmission means is connected to the network, whichever is the smaller.

(Supplemental note 21) The packet transmission method according to Supplemental note 18, wherein a rate at which the packet extraction means is made to extract packets addressed to each destination in a round-robin fashion is set so as to coincide with a transmission rate that the transmission means has set for each destination connected to the network, and the packet extraction means is made to manage, as credits, a total size of packets that can be extracted with respect to each destination.

(Supplemental note 22) The packet transmission method according to any one of Supplemental notes 19 to 21, wherein packets addressed to an identical destination that the packet extraction means is made to extract from the buffer means at a time are all packets accumulated in the buffer means, packets in such a number that a total size of packets to be extracted does not surpass a maximum packet size allowable for a network, or packets in such a number that a total size of or the total number of the packets does not surpass a predetermined total size of or the predetermined total number of packets.

The present invention was described above through exemplary embodiments thereof, but the present invention is not limited to the above exemplary embodiments. Various modifications that could be understood by a person skilled in the art may be applied to the configurations and details of the present invention within the scope of the present invention.

This application is based upon and claims the benefit of priority from Japanese Patent Application No. 2014-021370 filed on Feb. 6, 2014, the entire disclosure of which is incorporated herein.

INDUSTRIAL APPLICABILITY

The present invention is suitable for use in transmitting packets in a wideband manner between nodes communicating with each other via a network. The present invention is also suitable for use in transmitting I/O packets in a wideband manner in a bus system that connects computers and I/O devices using a network.

REFERENCE SIGNS LIST 110 first packet output node
120 first packet integration device
121 packet integration queue
121-1 internal queue
122 packet extraction unit
122-1 flow-by-flow credit buffer
122-2 credit recalculation timer
123 rate setting unit
123-A physical link band mode
123-B congestion control band mode
123-C individual flow band mode
124 packet encapsulation unit
125 encapsulation table
126 retransmission congestion control unit
127 packet decapsulation unit
210 second packet output node
220 second packet integration device
310 third packet output node
320 third packet integration device
400 network
500 first network node
510 packet output application
520 packet integration queue
530 packet integration unit
531 timer
540 memory
541 minimum integration number
542 timeout value
550 packet receiving unit

What is claimed is:

1. A packet transmission apparatus, comprising:
hardware processing circuitry configured to:
search, from a buffer in which packets are sorted and accumulated in accordance with each destination, for packets with respect to each destination to extract the packets and, when a plurality of packets addressed to an identical destination are accumulated, to extract the plurality of packets from the buffer; and
encapsulate the extracted packets into a single packet with respect to each destination, wherein
the hardware processing circuitry is further configured to:
extract, from the buffer, packets addressed to an identical destination in such a number that a total size of the packets to be extracted does not surpass a packet size allowed by a network, or packets addressed to an identical destination in such a number that a total size of or the total number of the packets does not surpass a predetermined total size of or a predetermined total number of packets, wherein
the hardware processing circuitry is further configured to:
determine a rate at which the packet extraction is performed based on a transmission rate that is set for each destination connected to the packet transmission apparatus by way of a network.

2. The packet transmission apparatus according to claim 1,
wherein the buffer is configured to sort and accumulate the packets in accordance with each destination; and
wherein the hardware processing circuitry is configured to transmit the encapsulated packet to the destination by way of a network.

3. The packet transmission apparatus according to claim 1, wherein
the hardware processing circuitry, in a round-robin fashion with respect to each destination, searches for and extracts packets that are sorted and accumulated in accordance with each destination.

4. The packet transmission apparatus according to claim 1, wherein
the hardware processing circuitry determines the rate at which the packet extraction is performed based on a band of a network connected to the packet transmission apparatus.

5. The packet transmission apparatus according to claim 4, wherein
the hardware processing circuitry determines the rate at which the packet extraction is performed based on either a total of transmission rates each of which is set for each destination connected to the packet transmission apparatus by way of a network or a band of the network connected to the packet transmission apparatus, whichever is the slower rate.

6. The packet transmission apparatus according to claim 1, comprising a plurality of modes including at least one of the following three modes:
a first mode in which a rate at which the packet extraction is performed is determined based on a band of a network connected to the packet transmission apparatus;
a second mode in which the rate at which the packet extraction is performed is determined based on either a total of transmission rates each of which is set for each destination connected to the packet transmission apparatus by way of a network or the band of the network connected to the packet transmission apparatus, whichever is the slower rate; and
a third mode in which the rate at which the packet extraction is performed is determined based on a transmission rate that is set for each destination connected to the packet transmission apparatus by way of the network,
wherein the hardware processing circuitry performs the packet extraction in any of the modes.

7. A packet transmission system, comprising
a plurality of packet transmission apparatuses according to claim 1, that are interconnected by way of a network and transmit and receive packets with one another by way of the network.

8. A packet transmission method, comprising:
searching, from a buffer in which packets are sorted and accumulated in accordance with each destination, for packets with respect to each destination to extract the packets and, when a plurality of packets addressed to an identical destination are accumulated, extracting the plurality of packets from the buffer;
encapsulating extracted packets into a single packet with respect to each destination; and
extracting, from the buffer, packets addressed to an identical destination in such a number that a total size of the packets to be extracted does not surpass a packet size allowed by a network, or packets addressed to an identical destination in such a number that a total size of or the total number of the packets does not surpass a predetermined total size of or a predetermined total number of packets, wherein
the hardware processing circuitry is further configured to:
determine a rate at which the packet extraction is performed based on a transmission rate that is set for each destination connected to the packet transmission apparatus by way of a network.

9. A non-transitory computer-readable storage medium storing a packet transmission program that causes a computer to execute:
a process that, from a buffer in which packets are sorted and accumulated in accordance with each destination, searches for packets with respect to each destination to extract the packets and, when a plurality of packets addressed to an identical destination are accumulated, extracting the plurality of packets from the buffer;
a process that encapsulates extracted packets into a single packet with respect to each destination; and
extracting, from the buffer, packets addressed to an identical destination in such a number that a total size of the packets to be extracted does not surpass a packet size allowed by a network, or packets addressed to an identical destination in such a number that a total size of or the total number of the packets does not surpass a predetermined total size of or a predetermined total number of packets, wherein
the hardware processing circuitry is further configured to:
determine a rate at which the packet extraction is performed based on a transmission rate that is set for each destination connected to the packet transmission apparatus by way of a network.

* * * * *